(12) United States Patent
Wang et al.

(10) Patent No.: US 9,077,820 B2
(45) Date of Patent: Jul. 7, 2015

(54) SHAREABLE APPLICATIONS ON TELECOMMUNICATIONS DEVICES

(71) Applicant: T-Mobile USA, Inc., Bellevue, WA (US)

(72) Inventors: Winston Wang, Seattle, WA (US); Adam Holt, London (GB); Jean-Luc Bouthemy, Sammamish, WA (US); Michael Kemery, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 14/139,709

(22) Filed: Dec. 23, 2013

(65) Prior Publication Data
US 2014/0112458 A1    Apr. 24, 2014

Related U.S. Application Data

(62) Division of application No. 12/544,404, filed on Aug. 20, 2009, now Pat. No. 8,654,952.

(51) Int. Cl.
| | |
|---|---|
| *H04M 3/42* | (2006.01) |
| *H04M 11/06* | (2006.01) |
| *H04W 4/20* | (2009.01) |
| *H04L 29/06* | (2006.01) |

(Continued)

(52) U.S. Cl.
CPC ............. *H04M 11/066* (2013.01); *G10L 15/30* (2013.01); *H04W 4/206* (2013.01); *H04L 65/4015* (2013.01); *H04L 67/06* (2013.01); *G06F 3/167* (2013.01); *G10L 15/26* (2013.01)

(58) Field of Classification Search
CPC .......................... H04M 7/006; H04L 29/08108
USPC .................... 379/201.01; 455/414.1; 709/232
See application file for complete search history.

(56) References Cited

U.S. PATENT DOCUMENTS

| | | |
|---|---|---|
| 5,023,907 A | 6/1991 | Johnson et al. |
| 6,767,212 B2 | 7/2004 | Thomas |

(Continued)

FOREIGN PATENT DOCUMENTS

| | | |
|---|---|---|
| KR | 20010096407 | 11/2001 |
| KR | 20020066804 | 8/2002 |

(Continued)

OTHER PUBLICATIONS

"AT&T Video Share Lets Wireless Customers Share Live Video", retrieved from: http://www.att.com/gen/press-room?pid=9199, printed on Feb. 26, 2009, 2 pages.

(Continued)

*Primary Examiner* — Simon King
(74) *Attorney, Agent, or Firm* — Lee & Hayes, PLLC

(57) ABSTRACT

During voice communication between multiple telecommunications devices, a shareable application facilitates concurrent sharing of data and processes between the devices. The application may be configured to monitor the voice communication and execute a predetermined function upon detecting a predetermined condition in the voice communication. The application may further facilitate sharing of functionality and user interface displays during the voice communication. In some implementations, a server computing device on a communications network may facilitate functions of shareable applications on one or more telecommunications devices.

27 Claims, 22 Drawing Sheets

(51) Int. Cl.
  *H04L 29/08* (2006.01)
  *G06F 3/16* (2006.01)
  *G10L 15/26* (2006.01)
  *G10L 15/30* (2013.01)

(56) References Cited

U.S. PATENT DOCUMENTS

| | | |
|---|---|---|
| 6,889,212 B1 | 5/2005 | Wang et al. |
| 7,046,139 B2 | 5/2006 | Kuhn et al. |
| 7,113,981 B2 | 9/2006 | Slate |
| 7,218,912 B2 | 5/2007 | Erskine et al. |
| 7,302,272 B2 | 11/2007 | Ackley |
| 7,415,711 B2 | 8/2008 | Chew et al. |
| 2001/0018660 A1 | 8/2001 | Sehr |
| 2002/0099552 A1 | 7/2002 | Rubin et al. |
| 2002/0156792 A1 | 10/2002 | Gombocz et al. |
| 2003/0078036 A1 | 4/2003 | Chang et al. |
| 2004/0166878 A1 | 8/2004 | Erskine et al. |
| 2004/0180648 A1 | 9/2004 | Hymel et al. |
| 2004/0235520 A1 | 11/2004 | Cadiz et al. |
| 2005/0096009 A1 | 5/2005 | Ackley |
| 2005/0125819 A1 | 6/2005 | Ono et al. |
| 2005/0278637 A1 | 12/2005 | Youm et al. |
| 2006/0101499 A1 | 5/2006 | Aravamudan et al. |
| 2006/0121428 A1 | 6/2006 | Terrazas |
| 2006/0122938 A1 | 6/2006 | Hicks et al. |
| 2006/0143047 A1 | 6/2006 | Briegs et al. |
| 2006/0143622 A1 | 6/2006 | Prabandham et al. |
| 2006/0189348 A1 | 8/2006 | Montulli et al. |
| 2006/0194181 A1 | 8/2006 | Rosenberg |
| 2006/0224943 A1 | 10/2006 | Snyder et al. |
| 2006/0242242 A1 | 10/2006 | Ezumi et al. |
| 2006/0255119 A1 | 11/2006 | Marchasin et al. |
| 2006/0258341 A1 | 11/2006 | Miller et al. |
| 2006/0270395 A1 | 11/2006 | Dhawan et al. |
| 2007/0006327 A1 | 1/2007 | Lal et al. |
| 2007/0021145 A1 | 1/2007 | Lam |
| 2007/0037562 A1 | 2/2007 | Smith-Kerker et al. |
| 2007/0037563 A1 | 2/2007 | Yang et al. |
| 2007/0039025 A1 | 2/2007 | Kraft et al. |
| 2007/0058637 A1 | 3/2007 | Lo |
| 2007/0070404 A1 | 3/2007 | Caradec et al. |
| 2007/0081075 A1 | 4/2007 | Canova, Jr. et al. |
| 2007/0099609 A1 | 5/2007 | Cai |
| 2007/0127633 A1 | 6/2007 | Hertel et al. |
| 2007/0198413 A1 | 8/2007 | Nagao |
| 2007/0250382 A1 | 10/2007 | Beck |
| 2008/0064381 A1 | 3/2008 | Ackley |
| 2008/0070608 A1 | 3/2008 | Ackley |
| 2008/0070609 A1 | 3/2008 | Ackley |
| 2008/0096544 A1 | 4/2008 | McNamara et al. |
| 2008/0096603 A1 | 4/2008 | Sparre |
| 2008/0140433 A1 | 6/2008 | Levy et al. |
| 2008/0162305 A1 | 7/2008 | Rousso et al. |
| 2008/0181201 A1 | 7/2008 | Park et al. |
| 2008/0209577 A1 | 8/2008 | Vrielink et al. |
| 2008/0215494 A1 | 9/2008 | Corbett |
| 2008/0233944 A1 | 9/2008 | Tu |
| 2008/0246605 A1 | 10/2008 | Pfeffer et al. |
| 2008/0256641 A1 | 10/2008 | Lo |
| 2008/0288966 A1 | 11/2008 | Maes |
| 2008/0299527 A1 | 12/2008 | Groot et al. |
| 2008/0307324 A1* | 12/2008 | Westen et al. ............. 715/753 |
| 2009/0005000 A1 | 1/2009 | Baker et al. |
| 2009/0006116 A1 | 1/2009 | Baker et al. |
| 2009/0006200 A1 | 1/2009 | Baker et al. |
| 2009/0015653 A1 | 1/2009 | Baek |
| 2009/0018963 A1 | 1/2009 | Abu-Amara |
| 2009/0038005 A1 | 2/2009 | Howarth |
| 2009/0054092 A1 | 2/2009 | Stonefield et al. |
| 2009/0069084 A1 | 3/2009 | Reece et al. |
| 2009/0106110 A1 | 4/2009 | Stannard et al. |
| 2009/0143007 A1 | 6/2009 | Terlizzi |
| 2009/0148824 A1 | 6/2009 | Argott |
| 2009/0149205 A1 | 6/2009 | Heredia et al. |
| 2009/0199178 A1 | 8/2009 | Keller et al. |
| 2009/0209240 A1 | 8/2009 | Mahowald |
| 2009/0225788 A1 | 9/2009 | Kephart et al. |
| 2009/0254656 A1 | 10/2009 | Vignisson et al. |
| 2009/0282005 A1 | 11/2009 | Kim et al. |
| 2009/0317778 A1 | 12/2009 | Oberman |
| 2010/0039254 A1 | 2/2010 | Cooper et al. |
| 2010/0122170 A1 | 5/2010 | Girsch et al. |
| 2010/0235476 A1 | 9/2010 | Lin et al. |
| 2010/0241530 A1 | 9/2010 | Murset |
| 2010/0299712 A1 | 11/2010 | Austin et al. |
| 2010/0322234 A1 | 12/2010 | Kodaka |
| 2011/0044438 A1 | 2/2011 | Wang et al. |
| 2011/0065419 A1 | 3/2011 | Book et al. |
| 2011/0202863 A1 | 8/2011 | Corrallo |
| 2012/0066088 A1 | 3/2012 | Murset |

FOREIGN PATENT DOCUMENTS

| | | |
|---|---|---|
| KR | 20060108093 A | 10/2006 |
| KR | 20070005163 A | 1/2007 |
| KR | 20070017229 A | 2/2007 |
| WO | WO2010008509 A2 | 1/2010 |

OTHER PUBLICATIONS

"Back to MediaCast FAQ", retrieved from: http://vumenow.com/support mediashare.php?faq=1, printed Feb. 26, 2009, 2 pages.

Bick, "An Allowance That's Measured in Minutes, Not Cents," retrieved at <<http://www.nytimes.com/2007/11/25/business/yourmoney/25allowance.html?_r=2&pagewanted=print>>, Nov. 25, 2007, 3 pgs.

"Cingular to roll out video/chat service", The Seattle Times: Tech Tracks, retrieved from: http://blog.seattletimes.nwsource.com/techtracks/archives/2006/06/cingular to roll out vi . . . , Jun. 28, 2006, 2 pages.

GSM Association, "Image Share Interoperability Specification 1.1", Official Document IR.79, Apr. 10, 2008, 13 pages.

GSM Association, "Video Share Interoperability Specification 1.3", Official Document IR.74, Oct. 30, 2008, 18 pages.

"My Reward Board," retrieved at <<http://www.myrewardboard.com/>> on Mar. 24, 2010, available as early as Jan. 25, 2010, 1 pg.

Office Action for U.S. Appl. No. 12/544,881, mailed on Apr. 11, 2012, Kemery, "Parent Telecommunication Device Configuration of Activity-Based Child Telecommunication Device", 17 pages.

Office Action for U.S. Appl. No. 12/544,881, mailed on Sep. 6, 2011, Kemery et al., "Parent Telecommunication Device Configuration of Activity-Based Child Telecommunication Device", 15 pages.

Final Office Action for U.S. Appl. No. 12/731,698, mailed on Jan. 23, 2013, Michael Kemery et al., "Chore and Rewards Tracker", 8 pages.

Final Office Action for U.S. Appl. No. 12/544,404, mailed on Oct. 19, 2012, Winston Wang et al, "Shareable Applications on Telecommunications Devices", 7 pages.

Office Action for U.S. Appl. No. 12/544,464, mailed on Nov. 1, 2013, Michael Kemery, "Licensed Content Purchasing and Delivering", 13 pages.

Non-Final Office Action for U.S. Appl. No. 12/731,717, mailed on Feb. 16, 2012, Winston Wang et al, "Shared Book Reading", 25 pages.

Non-Final Office Action for U.S. Appl. No. 12/544,464, mailed on Mar. 27, 2013, Michael Kernery, "Licensed Content Purchasing and Delivering", 11 pages.

Non-Final Office Action for U.S. Appl. No. 12/732,103, mailed on Apr. 11, 2012, Marianna Wickman, et al., "Parent-Controlled Episodic Content on a Child Telecommunication Device", 10 pages.

Non-Final Office Action for U.S. Appl. No. 12/544,404, mailed on Apr. 26, 2012, Winston Wang et al, "Shareable Applications on Telecommunications Devices", 10 pages.

Final Office Action for U.S. Appl. No. 12/544,464, mailed on May 23, 2013, Michael Kernery, "Licensed Content Purchasing and Delivering", 12 pages.

Final Office Action for U.S. Appl. No. 12/544,464, mailed on Jun. 1, 2011, Michael Kernery, "Licensed Content Purchasing and Delivering".

(56) References Cited

OTHER PUBLICATIONS

Final Office Action for U.S. Appl. No. 12/731,717, mailed on Aug. 16, 2012, Winston Wang et al, "Shared Book Reading", 16 pages.
Final Office Action for U.S. Appl. No. 12/732,103, mailed on Aug. 23, 2012, Marianna Wickman, et al., "Parent-Controlled Episodic Content on a Child Telecommunication Device", 13 pages.
Non-Final Office Action for U.S. Appl. No. 12/731,698, mailed on Aug. 30, 2012, Michael Kemery et al., "Chore and Rewards Tracker", 7 pages.
Office action for U.S. Appl. No. 12/732,103, mailed on Sep. 19, 2013, Wickman et al., "Parent-Controlled Episodic Content on a Child Telecommunication Device", 16 pages.
Office action for U.S. Appl. No. 12/731,717, mailed on Sep. 23, 2013, Wang et al., "Shared Book Reading", 17 pages.
Office Action for U.S. Appl. No. 12/544,881, mailed on Sep. 30, 2013, Michael Kemery, "Parent Telecommunication Device Configuration of Activity-Based Child Telecommunication Device", 19 pages.
Oomble.com, "Frequently Asked Questions", Last Revised Aug. 22, 2007, Retrieved from <<http//web.archive.org/web/20080122014735/www.oomble.com/public/faq.jsp>> on Jan. 18, 2011, 12 pages.
The PCT Search Report & Written Opinion mailed Oct. 27, 2011 for PCT Application No. PCT/US11/28527, 11 pages.
The PCT Search Report & Written Opinion mailed Oct. 31, 2011 for PCT Application No. PCT/US11/28545, 8 pages.
The PCT Search Report & Written Opinion mailed Nov. 30, 2011 for PCT Application No. PCT/US11/28371, 10 pages.
PCT International Search Report and Written Opinion mailed Mar. 29, 2011 for PCT Application No. PCT/US10/45991, 10 pgs.
PCT International Search Report and Written Opinion mailed Apr. 15, 2011 for PCT Application No. PCT/US10/45722, 10 pgs.
The PCT Search Report and Written Opinion mailed Jun. 27, 2011 for PCT Application No. PCT/US10/45996.
Raffle, et al., "Family Story Play: Reading with Young Children (and Elmo) Over a Distance", CHI 2010, Apr. 10-15, 2010, Atlanta, Georgia, 10 pages.
Yarosh et al. , "Developing a Media Space for Remote Synchronous Parent Child Interaction", IDC 2009, Jun. 3-5, 2009, Como, Italy, 10 pages.
Final Office Action for U.S. Appl. No. 12/731,717, mailed on Feb. 6, 2014, Winston Wang et al, "Shared Book Reading", 17 pages.
Office action for U.S. Appl. No. 12/731,717, mailed on Jun. 24, 2014, Wang et al., "Shared Book Reading", 10pages.

* cited by examiner

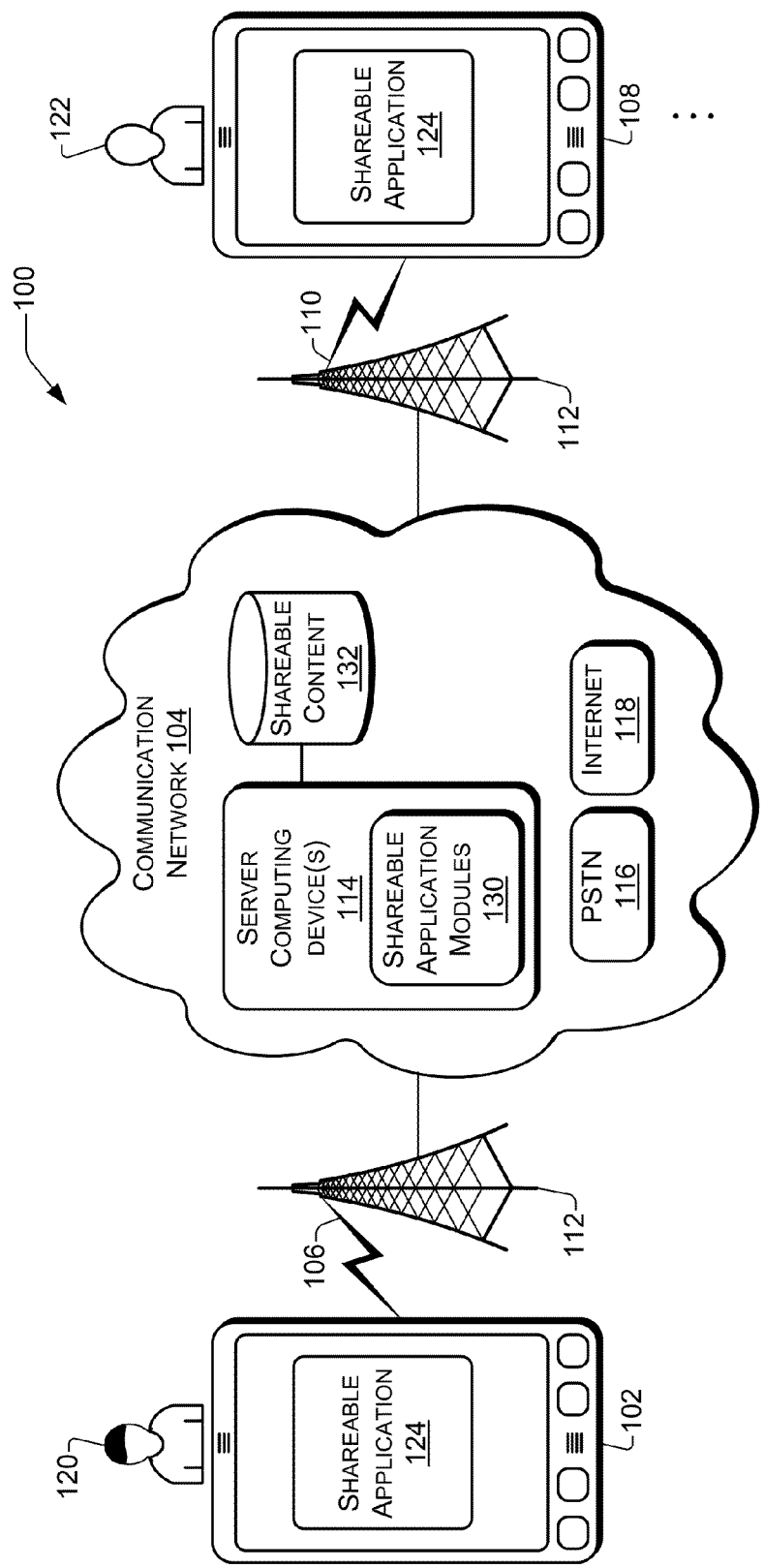

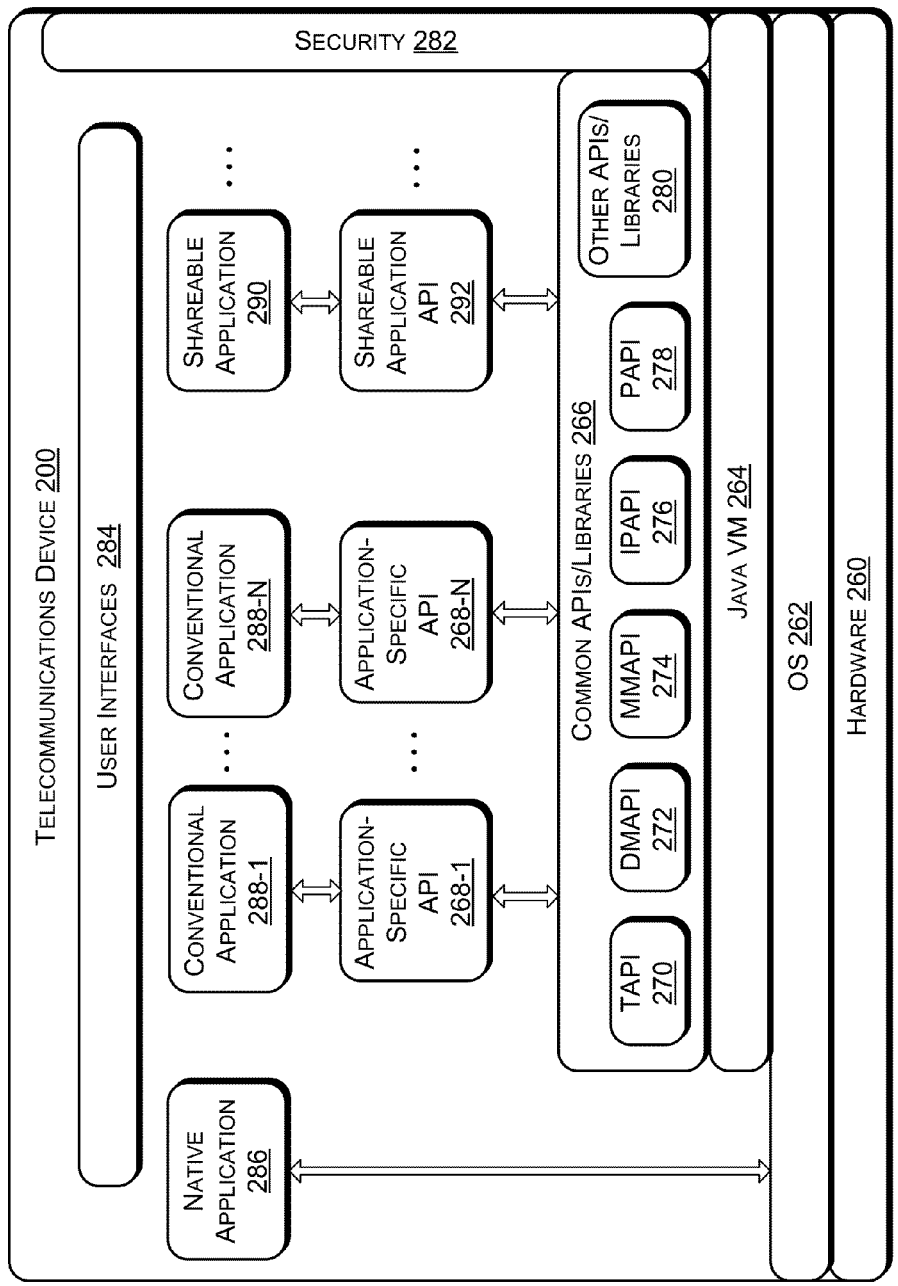

SHAREABLE APPLICATIONS ON TELECOMMUNICATIONS DEVICES

RELATED APPLICATIONS

This patent application is a divisional application of and claims priority to the U.S. patent application entitled "Shareable Applications on Telecommunications Devices" with Ser. No. 12/544,404 filed on Aug. 20, 2009, which is fully incorporated herein by reference.

BACKGROUND

Over the past thirty years, telephony has significantly evolved from the once-ubiquitous public switched telephone network (PSTN) service. Telecommunications consumers today have a wide range of telecommunications options to choose from, including traditional landline phone service, IP-based telecommunications services (based on, for example, Voice over Internet Protocol), cellular telecommunications services, and converged telecommunications services (such as Unlicensed Mobile Access or UMA).

Telecommunications devices now consist of a myriad of form factors, such as traditional landline phones, cordless phones, cellular phones, smart phones, PDA phones, desktop and portable computers, media players, home telecommunications hubs, or the like (hereinafter "telecommunications devices"), which have become a ubiquitous part of modern life. Originally, most of these telecommunications devices just provided two-way voice communication between a first person at a first location using a first telecommunications device and a second person at a second location using a second telecommunications device, so that the first person and the second person were able to carry on a conversation. For example, a voice communication or call normally involved real-time, duplex, synchronous voice communications, in which all participants hear the other participants in real time, all participants can simultaneously speak, and all participants are actively engaged and respond directly and immediately to each other without significant interruption.

More recently, telecommunications devices are frequently capable of both voice and data communications, using various modes of such communications. Email, text messages (e.g., Short Message Service or SMS), and multimedia messages (e.g., Multimedia Messaging Service or MMS) are well-known forms of asynchronous data communications. Email was originally used with computers, but is now commonly sent and received through telecommunications devices as well. SMS text messaging has been used for many years in the area of cellular telecommunications. Participants are typically engaged in the communications at different times, and their participation might occur as a number of small, non-contiguous, asynchronous interactions.

In addition to person-to-person communications, many modern telecommunications devices are capable of other types of data communications through access to the Internet and other databases. For example, many telecommunications devices have built-in web browsers for Internet navigation.

Voicemail is another voice communications mode, in which a caller leaves a recorded message for a recipient. The recipient listens and responds to a voicemail message at his or her leisure. Because of the time lag between leaving the message and actually listening or responding to the message, this communications mode is referred to as asynchronous.

It should be noted that both voice and data communications might be implemented using the same wireless and IP-based technologies. In some situations, particularly with conventional cellular or IP-based systems, voice might be communicated using a proprietary cellular protocol, while data and non-voice communications are based on other protocols carried over a cellular and/or an IP-based telecommunications network.

Telecommunications devices vary in complexity and capabilities, from simple devices that support only voice communications, to very sophisticated devices with capabilities of personal computers. Higher-end telecommunications devices are identified to include smart phones, but increasingly include desktop and portable computers. These include telecommunications devices that typically have an operating system executed from some form of solid-state memory by one or more processors.

Further, advances in technology have added an ever increasing array of features and capabilities to telecommunications devices, such as touch screens, video and still cameras, web browsing capabilities, email sending and receiving capabilities, music download, storing and playback capabilities, calendar and contact managing capabilities, GPS (global positioning system) location and navigation capabilities, game playing capabilities, and television capabilities, to name a few. Many of these features and capabilities are provided through specialized applications resident on the telecommunications devices. For example, many telecommunications devices allow the user to further customize the device through custom configuration options or by adding third-party software. Such software is available for many different functions, not limited to communications. For instance, a variety of applications, such as dedicated computer programs or software, applets, or the like, can be loaded on a telecommunications device by the consumer, the network service provider, or by the telecommunications device manufacturer. These applications can then be activated on the telecommunications device as needed or desired by the user, or as particular functions of the telecommunications device are accessed. Some of these applications may come pre-installed by the network service provider or manufacturer, while others may be purchased and installed by the users of the telecommunications devices after purchase.

Further, many network service providers or telecommunications device manufacturers now provide a website or "store" from which users may purchase various applications (i.e., an "app store") to add various capabilities to their telecommunications devices. These network service providers or manufacturers also enable third parties to create third party applications that can be downloaded and used on the telecommunications devices. For example, an app store might make available for download a large number of applications written by third parties, in addition to applications provided by the network service provider or by the telecommunications device manufacturer. The third party applications and service provider/manufacturer applications might typically be marketed for a specified download fee, and may be purchased from the app store through the Internet or over the network service provider's own network. By picking and choosing which applications to download to a particular telecommunications device, the telecommunications device owner can decide which corresponding capabilities the particular telecommunications device will be endowed with. Further, word-of-mouth or viral marketing can contribute greatly to the sales success of particular applications. For example, a particular user might show an application on her telecommunications device to her friends, who will then purchase the application for use on their own telecommunications devices. In some cases, the application might be transferred to the telecommunications devices for a free trial and the users are then given an option to purchase the application.

Some applications are able to function while a user of a telecommunications device is carrying on a conversation on the telecommunications device. For example, a user may have a headset or speakerphone feature enabled so that the user is able to view the display of the telecommunications device while talking on the telecommunications device. Thus, the user is then able to view a user interface presented by an application while carrying on a conversation. For instance, during a voice call, the user of the telecommunications device may initiate a personal information manager (PIM) application on the telecommunications device for accessing a phone number of a third party to read the third party's phone number to the person on the other end the call. Thus, while telecommunications devices currently provide a multitude of features, the ever-increasing popularity of telecommunications devices makes it desirable to develop new types of uses, applications and features.

SUMMARY

Implementations disclosed herein provide shareable applications executable on telecommunications devices that facilitate sharing of information and processes during voice communications, thereby providing a variety of new capabilities to the telecommunications devices.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 1 illustrates a schematic view of an exemplary implementation of a communication system.

FIG. 2B illustrates an exemplary logical configuration of an implementation of a telecommunications device.

DETAILED DESCRIPTION

Overview

Figure 2A:
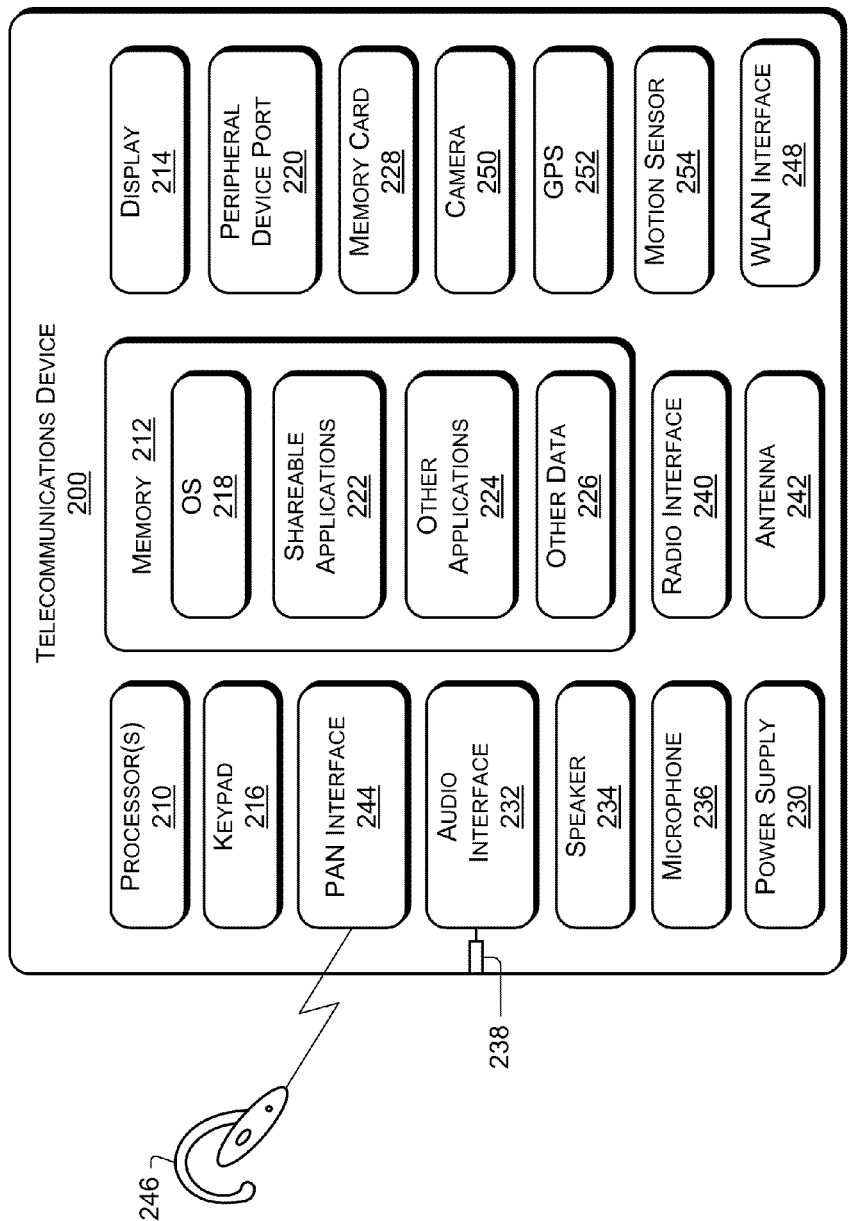
FIG. 2A illustrates an exemplary configuration of an implementation of a telecommunications device.

Some implementations disclosed herein provide shareable applications, architecture, user interfaces, program modules, and the like, for enabling transferring and sharing of data between a plurality of telecommunications devices during a simultaneous voice communication on the telecommunications devices. In some implementations, one or more shareable applications on a telecommunications device are able to interact with a voice communication for carrying out one or more functions of the application in response to or as a result of detecting a predefined hook or a particular portion of the voice communication. For example, a shareable application on a telecommunications device can interact with a voice communication to provide a function or result in response to a detected aspect of the voice communication. Furthermore, in some implementations, applications executing on each of the telecommunications devices interact with each other during a voice communication and/or interact with the voice communication itself. For example, shareable applications on the telecommunications devices can enable exchange of data during a voice call and/or create a shared environment displayed on each telecommunications device for enabling the users of the telecommunications devices to interact with each other and/or share content and experiences. Additionally, in some implementations, one or more server computing devices on the communication network can also include shareable applications or modules that interact with, facilitate, manage or cooperate with the applications executing on one or more telecommunications devices. For example, for some implementations herein, it is desirable to leverage the greater processing capabilities and/or mass storage capabilities and/or control capabilities of one or more computing devices on the communication network for providing some of the functions and features of some shareable applications, examples of which are discussed in detail below.

Exemplary Communication System

FIG. 1 illustrates an exemplary implementation of a communication system 100, which includes a first telecommunications device 102 communicating with a communication network 104 through, in this example, a wireless link 106. A second telecommunications device 108 communicates with the communication network 104 via a second wireless link 110. As discussed more fully herein, it will be understood by one of skill in the art that although wireless links 106, 110 are typical of wireless or cellular telecommunications, any type of wired or wireless connection, such as wired or wireless communications associated with traditional landline networks and IP-based networks, or any combination of these, provide suitable implementations. For cellular-based embodiments, at least a portion of the communication network 104 may enable communication by a plurality of telecommunications devices, including the telecommunications devices 102, 108, via networks utilizing any type of cellular-radio-based communication protocols such as GSM (Global System for Telecommunications), UMTS (Universal Mobile Telecommunication system), CDMA (Code Division Multiple Access), D-AMPS (Digital Advanced Mobile Telecommunications device System), TDMA (Time Division Multiple Access), iDEN (Integrated Digital Enhanced Network), GPRS (General Packet Radio Service), EDGE (Enhanced Data rates for GSM Evolution), WCDMA (Wideband Code Division Multiple Access), UMTS (Universal Mobile Telecommunications System), HSPA (High Speed Packet Access), HSPA+, LTE (Long Term Evolution), LTE Advanced, and their variants. The communication network 104 may also enable or permit communication between or with the plurality of telecommunications devices via a peer-to-peer or ad hoc system utilizing appropriate communication protocols such as Bluetooth®, IEEE 802.11, IEEE 802.16, IEEE 802.20 and the like. Further, while implementations are often illustrated herein as being between two telecommunications devices, it should be understood that three or more telecommunications devices can communicate simultaneously, and that the implementations herein can be applied to three or more telecommunications devices as well.

The communication network 104 may include a variety of components for proper operation and communication with the telecommunications devices 102, 108. For example, for the communications network and infrastructure illustrated in FIG. 1, the communication network 104 may include wireless communication capabilities for connecting a plurality of base stations 112 (which may include traditional cellular base stations, femtocells, picocells, WiFi access points and other access points) and one or more server computing devices 114, such as network service provider (NSP) servers, Internet service provider servers, home network servers, enterprise servers, or other server computing devices for controlling communications on the communication network 104. The server computing device(s) 114 may be part of a data center, server farm, computing cluster, storage area network, or other architecture for receiving, processing and transmitting communications and application threads and processes, as well as for storing content to be shared between telecommunications devices 102, 108. A variety of additional components may be coupled between and/or to the plurality of base stations 112 and the server computing device(s) 114 and other communication network components, but these additional components are not illustrated in this implementation for clarity of explanation.

The communication system 100 and communication network 104 may also include wire-based networks (e.g., telephone, cable) and other wireless networks (e.g., cellular, satellite, etc.). The communication system 100 and communication network 104 may use any number of protocols and configurations to enable a plurality of telecommunications devices to access other devices and resources. The communication system 100 and communication network 104 may include several types of circuit-switched telephone networks, such as a Public Switched Telephone Network (PSTN) 116 and packet-switched networks. Thus, communication network 104 is able to communicate with landline telephones via the PSTN 116, and may further include a plurality of wireless communication networks maintained by a plurality of different wireless network service providers.

Furthermore, communication network 104 may also include or be in communication with the Internet 118. For example, at least some server computing devices 114 can be able to communicate with the Internet 118. Thus, in some implementations or situations, the telecommunications devices 102, 108 can access the Internet 118 through wired or wireless communications via server computing devices 114, such as via EVDO (Evolution-Data Optimized) communications or other technologies. In other implementations or situations, telecommunications devices 102, 108 can access the Internet 118 directly, such as via a wireless access point using Wi-Fi, WiMax, or the like.

In the implementation illustrated in FIG. 1, a user 120 of the first telecommunications device 102 may place a voice call to a user 122 of second telecommunications device 108, or vice versa, through communication network 104. Additionally, user 120 may elect to send a data signal, such as a text message or picture message to the user 122, or vice versa, via communication network 104. Also, the users 120, 122 may connect telecommunications devices 102, 108, respectively to the Internet 118, such as via cellular communications or wireless access points, such as for sending emails, instant messaging, or the like.

At least one of the telecommunications devices 102, 108 includes one or more shareable applications 124. For example, suppose the user 120 calls the user 122. The voice call is routed from the first telecommunications device 102 to the second telecommunications device 108 via the communication network 104. During this conversation, suppose the user 120 wants to share some information, process, or interactive experience with the second user 122. For example, the first user might want to show some pictures of a recent vacation or a slide show of an upcoming business meeting. During the call, some implementations of the shareable applications 124 allow the users to share the experience of viewing the pictures or slides while being able to discuss them at the same time. Further, the shareable application 124 may monitor or interact with the voice communication to provide additional functions and features to enhance the users' experience while viewing the pictures or slides.

Further, server computing device(s) 114 on the communication network can also include one or more shareable application modules 130 that can, in some implementations, interact with, cooperate with, or facilitate the sharable applications on the telecommunications devices. The shareable application modules 130 may be provided in addition to or instead of shareable applications 124 on the telecommunications devices. For example, shareable content 132 may be stored on the communication network, such as at a storage array, data center, server farm, or the like. The shareable content may include the photographs or slides that the first user 120 wants to share with the second user 122. Thus, rather than having to store the content on the telecommunications device 102 and transmit the content to the other telecommunications device 108, the server computing device can retrieve the shareable content 132 and transmit the shareable content to each of the telecommunications devices during the voice communication. In some examples, the shareable content may be transmitted by downloading the content to the receiving device (i.e., a copy is stored at the receiving device), while in other examples, the content may be served or streamed in a transitory manner (i.e., the content may be available to the receiving device for read-only access, but cannot be stored on the receiving device).

In some implementations, as described further below, shareable applications monitor a voice communication and perform a function in response to detecting a specified hook or predetermined condition in the voice communication. Further, in some implementations, shareable applications include applications executing on a plurality of telecommunications devices that enable sharing of data among corresponding applications on the telecommunications devices while the users of the telecommunications devices carry on a voice communication with each other. In addition, in some implementations, the server computing device(s) include counterpart shareable application modules that carry out functions that facilitate the shareable applications on one or more telecommunications devices. Additionally, some implementations include shareable applications executing on a plurality of telecommunications devices that enable sharing of data among corresponding applications on the telecommunications devices while the users carry on a voice communication with each other and the shareable applications also monitor the voice communication for performing one or more functions in response to a specified hook or predetermined condition in the voice communication.

Exemplary Telecommunications Device Architecture

FIG. 2A illustrates an exemplary configuration of a telecommunications device 200 suitable for executing the shareable applications implemented herein. Telecommunications device 200 is an example of a telecommunications device that may correspond to either of telecommunications devices 102, 108, or other telecommunications devices discussed herein. Telecommunications device 200 has one or more processors 210, a memory 212, a display 214, and a keypad 216. Memory 212 generally includes both volatile memory and non-volatile memory (e.g., RAM, ROM, Flash Memory, miniature hard drive, memory card, or the like). Telecommunications device 200 includes an operating system (OS) 218, which is resident in memory 212 and which is executed by processor 210. Keypad 216 may be a push button numeric dialing pad (such as on a typical telecommunications device), a multi-key keyboard (such as a conventional QWERTY keyboard), or one or more other types of keys or buttons, and may also include a joystick-like controller and/or designated navigation buttons, or the like. Display 214 may be a liquid crystal display, or any other type of display commonly used in telecommunications devices. For example, display 214 may be a touch-sensitive touch screen, and can then also act as an input device or keypad, such as for providing a soft-key keyboard, navigation buttons, or the like. A peripheral device port 220 may be included and may be of the type to accept additional memory cards, game cards, modem cards, or other types of peripheral devices.

One or more shareable application programs 222, as discussed above, and as described further below, are loaded into memory 212 and are run by or in conjunction with operating system (OS) 218. Further, one or more other application programs 224 may also be included in memory 212. Examples of other application programs 224 include conventional application programs, such as game programs, navigation programs, installation wizard programs, email programs, scheduling programs, PIM (personal information management) programs, word processing programs, spreadsheet programs, Internet web browser programs, and so forth. Telecommunications device 200 also includes other data storage 226 within memory 212. Other data storage 226 may be used to store information that is retained when the telecommunications device 200 is powered down. For example, applications 222 may use and store persistent information in the other data storage 226, such as messages used by an e-mail application, contact information used by a personal information manager, documents used by a word processing program, device driver programs, and the like.

Additionally, in some implementations, telecommunications device 200 may include a SIM (subscriber identity module) or UICC (universal integrated circuit) card, which is a removable card 228 whose functions include identifying a user of the telecommunications device 200 to the network service provider. One or more of the shareable applications 222 may additionally or alternatively be stored in removable card 228, such that the one or more shareable applications 222 become available to the telecommunications device 200 when the removable card 228 is installed in the telecommunications device 200. In this manner a user's shareable applications can be easily moved between telecommunications devices as the removable card 228 is moved between those devices, such as when a user purchases a new telecommunications device, replaces a broken device, or the like.

Telecommunications device 200 also includes a power supply 230, which may be implemented as one or more batteries. The power supply 230 might further include an external power source, such as an AC adapter or a powered docking cradle for supplementing or recharging the batteries.

Telecommunications device 200 also includes an audio interface 232 that is coupled to a built-in speaker 234 and microphone 236. The audio interface 232 is used to provide audible signals to and receive audible signals from the user of telecommunications device 200. For example, the speaker 234 provides audible output and microphone 236 receives audible input, such as to facilitate a voice communication. Telecommunications device 200 may include a speakerphone feature to enable telecommunications device 200 to be held away from the user's head during use, thereby facilitating simultaneous viewing of display 214. Audio interface 232 is also in communication with a headphone jack 238 to permit a wired headset including earphones and a microphone to be plugged in to telecommunications device 200 in some implementations to operate in place of built-in speaker 234 and microphone 236.

Telecommunications device 200 also includes, in wireless embodiments, a radio transceiver and interface 240 that performs the function of transmitting and receiving radio frequency communications via an antenna 242. The radio interface 240 facilitates wireless connectivity between the telecommunications device 200 and various cell towers, base stations and/or access points. Transmissions to and from the radio interface 240 are conducted under control of the operating system 218. For example, communications received by the radio interface 240 may be disseminated to application programs 222 via the operating system 218, and vice versa.

Telecommunications device 200 also may include a personal area network (PAN) interface 244, such as Bluetooth®, that performs a function of transmitting and receiving short-range radio communications. For example, a wireless headset 246 may be connected for communication with telecommunications device 200 via Bluetooth® interface 244 for providing an earphone and microphone to be used in place of built in speaker 234 and microphone 236. Further, PAN interface 244 may be used for other functions, as is known in the art, such as communicating directly with nearby devices that are also Bluetooth® enabled.

Telecommunications device 200 also may include a wireless LAN interface 248 (e.g., WiFi) that performs the function of transmitting and receiving wireless communications using the IEEE 802.11, 802.16 and/or 802.20 standards. For example, telecommunications device 200 can use interface 248 to communicate directly with a nearby wireless access point such as for accessing the Internet directly without having to perform the access through the network service provider's network.

Telecommunications device 200 also may include a camera 250 for taking video and still photographs using telecommunications device 200. Telecommunications device 200 also may be outfitted with a global positioning system (GPS) transponder 252 for endowing telecommunications device 200 with various GPS capabilities such as navigation, mapping, or the like. Further, telecommunications device 200 may include a motion sensor 254, such as an accelerometer for determining position, attitude and/or movement of telecommunications device 200, such as for adjusting display orientation, or the like. In addition, while various components, features, and functions of a telecommunications device 200 have been described in the implementation illustrated in FIG. 2A, it should be understood that numerous other configurations, components, features, and the like may be incorporated into telecommunications devices described herein, and that the implementations herein are not limited to any particular configuration for telecommunications devices.

Exemplary Telecommunications Device Logical Configuration

FIG. 2B illustrates an exemplary logical configuration of an implementation of telecommunications device 200 capable of running a variety of different types of applications, including the shareable applications implemented herein. Telecommunications device 200 may correspond to any of telecommunications devices 102, 108, or other telecommunications devices discussed herein. In this example, telecommunications device 200 includes hardware 260 which, as described above with reference to telecommunications device 200 of FIG. 2A, may include a wireless radio transceiver, a suitably programmed processor, and a memory that stores executable code executed by the processor for carrying out the operations described herein. In some implementations, the processor may be implemented as one or more processing devices, discrete logic, or any suitable combination of hardware, software, or firmware for executing the operating system, application program interfaces (APIs), modules, applications, and other software components described.

Telecommunications device 200 includes a plurality of program modules which in this example include an operating system 262, a Java virtual machine 264, a plurality of common APIs and libraries 266, and a plurality of application specific APIs 268-1 . . . 268-N. The Java virtual machine is one example of an implementation for providing and executing the common APIs/libraries 266 on the OS 262, and it should be understood that the disclosure herein is not limited to this implementation. In this example, at least some of the common APIs/libraries 266 are used to interface with hardware components or processes of telecommunications device 200, and are generally shared in common by all the applications that run on the telecommunications device. The common APIs/libraries 266 may include for example, a telephony API (TAPI) 270, a telecommunications device management API (DMAPI) 272, a multimedia API (MMAPI) 274, an Internet Protocol API (IPAPI) 276, a peripheral API (PAPI) 278, or any other suitable shared APIs 280. A security layer 282 on telecommunications device manages application authorization and access to the operating system 262 and hardware 260 of telecommunications device 200.

Common APIs and libraries are shared among various applications, and have at least two characteristics, namely an interface and an object, for providing services. The interface is the specification of the API's public methods. The object implements the interface and provides the functionality described in the interface. In some implementations, invoking a method on a common API is done in the context of the caller, such as via a thread or stack. A common API may return a value to the requesting caller by depositing the value directly on the caller's stack. Examples of services provided by common APIs include messaging, security, digital rights management (DRM), device management, persistence, synchronization and power management. In addition, a library is a set of services contained in an object that can either be statically linked or dynamically loaded into executable code. Library services may invoke other library services or services contained in daemons, which are external to the library and may also run in a different process context.

Various applications are able to execute on telecommunications device 200. The applications are typically user-initiated executable code whose lifecycle (start, stop, suspend, pause, resume) may be managed by the user, by the OS 262, or by another application. In some cases, the applications may present a user interface 284 which may overlay or augment a user interface presented by the OS 262, and/or in some cases the applications may use or provide services.

In the illustrated example, the applications include one or more native applications 286, one more conventional applications 288-1 . . . 288-N, and one or more shareable applications 290. The one or more shareable applications 290 are designed to operate on the telecommunications device 200 during a simultaneous voice communication, and are described in additional detail below. Shareable applications 290 use a shareable application API 292 and/or other middleware, which enables the shareable application 290 to interact with the operating system 262, the telecommunications device hardware 260, and the common APIs/libraries 266. For example, it is desirable for the shareable applications 290 to run off a shareable application API 292 or other middleware that renders development of shareable applications 290 uniform across multiple types of telecommunications devices. Thus, the shareable application API 292 may be developed specifically for a certain model or brand of telecommunications device, while the corresponding shareable application 290 is designed to function on numerous different types of telecommunications devices. Native applications 286 are applications that are able to interact directly with the operating system 262 and do not generally require access to the common APIs/libraries 266 or JAVA virtual machine 264. Some or all of conventional applications may be third party applications, such as might be downloaded from an apps store for execution on telecommunications device 200. These conventional applications 288-1 . . . 288-N may each include a corresponding application-specific API 268-1 . . . 268-N that enables the application 288 to interact with the hardware and other services available on telecommunications device 200. Each of the functional blocks, as illustrated in FIG. 3, communicate with one another through conventional communication links represented by the arrows, such as through suitable API method calls or any other suitable techniques.

Server Computing Device

Figure 3:
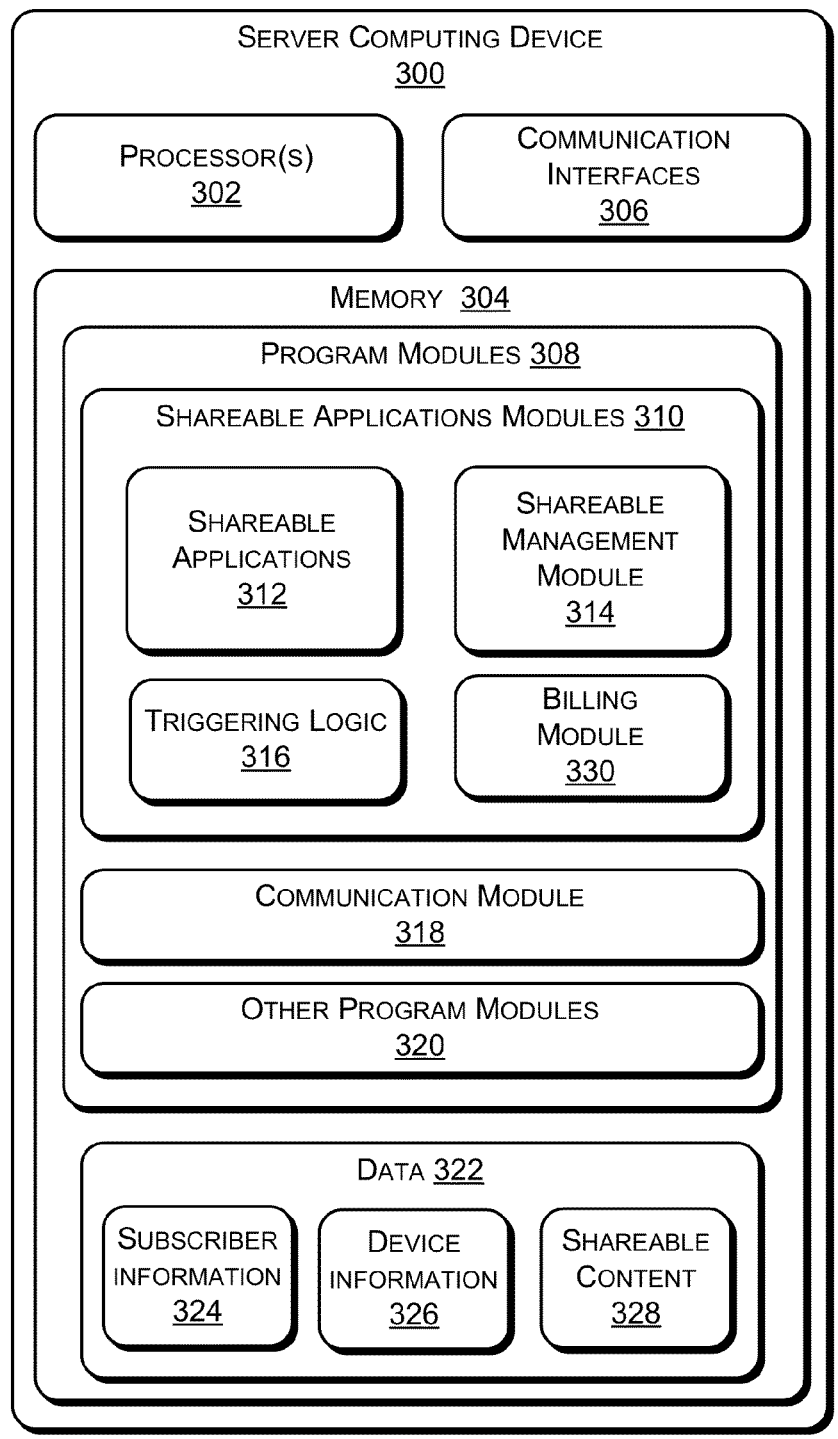
FIG. 3 illustrates an exemplary configuration of a server computing device.

FIG. 3 illustrates an exemplary logical and hardware configuration of a server computing device 300. Implementations of server computing device 300 may correspond to the one or more server computing devices 114, such as NSP servers, or other servers or computing devices used to implement and facilitate the use of the shareable applications herein over a network, or the like. In the illustrated example, server computing device 300 includes one or more processors 302, a memory 304, and one or more communication interfaces 306. The processor(s) 302 can be a single processing unit or a number of processing units, all of which could include multiple computing units in a single computer or multiple separate computers. The processor(s) 302 may be implemented as one or more microprocessors, microcomputers, microcontrollers, digital signal processors, central processing units, state machines, logic circuitries, and/or any devices that manipulate signals based on operational instructions. Among other capabilities, the processor(s) 302 can be configured to load and execute computer-readable instructions stored in the memory 304 or other computer-readable storage media.

The memory 304 can include any computer-readable storage media known in the art including, for example, volatile memory (e.g., RAM) and/or non-volatile memory (e.g., flash, etc.), mass storage devices, such as hard disk drives, solid state drives, removable media, including external and removable drives, or the like. The memory 304 stores processor-executable program instructions or code that can be executed by the processor(s) 302 for carrying out the services, methods and functions described herein.

The communication interface(s) 306 facilitate communication between the server computing device 300 and telecommunications devices 102, 108, 200. For example, the communication interface(s) 306 may include one or more ports for connecting to a number of telecommunication devices. The communication interface(s) 306 can facilitate communications within a wide variety of networks and protocol types, including wireless networks (e.g., cellular, satellite, WLAN, etc.) and wired networks (e.g., LAN, cable, etc.).

Memory 304 includes a plurality of program modules 308 stored therein and executable by processor(s) 302 for carrying out implementations herein. Program modules 308 include shareable application modules 310 that include one or more shareable applications 312, a shareable application management module 314 for determining which shareable application to use and for controlling use of those application, and triggering logic 316, that determines when a shareable application on a telecommunications device needs to be facilitated, interacted with, or the like. Program modules 308 also include a communication module for enabling the server computing device to communicate with telecommunications devices and other computing devices, and other program modules, such as an operating system, drivers, and the like. Server computing device 300 also includes various types of data 322, such as subscriber information 324 and device information 326, and service provider information 328. Additionally, server computing device 300 may also store shareable content 328 onboard, but in other implementations, as illustrated in FIG. 1, this content may be stored in a separate mass storage array or other storage facility. Further, server computing device may include a billing module 330 that can charge users for network activities, such as storing shareable content 132, 328 on the server computing device 300, transmission or streaming of the content to a telecommunications device, executing processor-intensive applications, or the like. In addition, billing module can also track and charge for sales and downloading of shareable applications. For example, shareable application management module 314 may provide an application store for sale and download of shareable applications to the telecommunications devices. Billing module 330 can track these sales and bill appropriately. Further in some implementations, shareable application management module 314 may include digital rights management features for controlling access to sharable content 132, 328 that is subject to digital rights management (e.g., music, images, video, etc. that is subject to copyright protection). Other variations will also be apparent to those of skill in the art, and thus, implementations disclosed herein are not limited to the particular example illustrated.

Shareable Applications

As discussed above, shareable applications according to implementations herein may be included on at least one telecommunications device that is party to a voice communication involving a plurality of telecommunications devices. In some implementations, the shareable application runs in the background on the telecommunications device and becomes active only upon detecting a particular predetermined condition in the voice communication. Further, in some implementations, the shareable application may include multiple instances on multiple telecommunications devices that interact with each other, and that may be activated on a first telecommunications device and also on a second telecommunications device to which the first telecommunications device is connected by a voice communication. Accordingly, in some implementations, the shareable applications are unilateral and only need to be activated on a single telecommunications device, while in other implementations the shareable applications are bilateral and need to be activated on two or more telecommunications devices that are party to a voice communication.

Unilateral Shareable Applications

Figure 4:
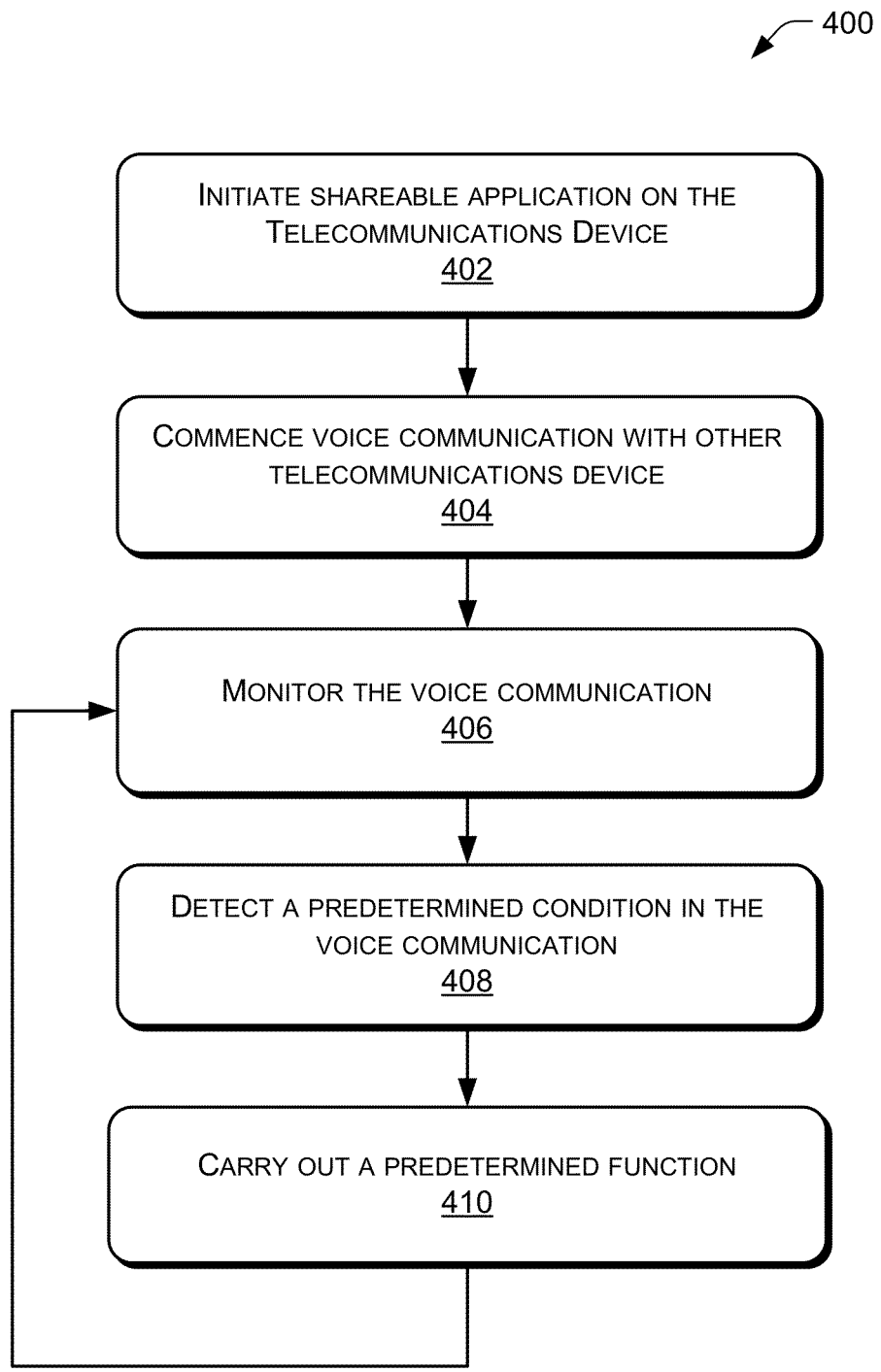
FIG. 4 illustrates a flow chart representing an exemplary implementation of a process carried out in conjunction with execution of a unilateral shareable application on a telecommunications device.

FIG. 4 illustrates an exemplary process 400 carried out in conjunction with execution of a unilateral shareable application on a first telecommunications device, such as any of telecommunications devices 102, 108, 200 described above, or other telecommunications devices described herein.

At block 402, a sharable application is initiated on a telecommunications device. For example, the shareable application may be activated upon start up of the telecommunications device or can be selected by a user of the telecommunications device to become active at some point. In some implementations, the shareable application may start up or become active automatically, such as when the telecommunications device initiates an outgoing call, or receives an incoming call, or in response to some other trigger event. For example, an API, such as shareable application API 292, may be installed on the telecommunications device and configured to automatically start the shareable application when an incoming or outgoing voice communication is detected. In other implementations, the user may decide to activate the shareable application after the voice communication has been established.

At block 404, a voice communication is established between a plurality of telecommunications devices for enabling voice communications to be carried out between the telecommunications devices. For example, each of the telecommunications devices may initiate an outgoing communication, or receive an incoming communication. In a particular example, a voice telecommunication is established, in wireless cellular embodiments, when a telecommunications device user dials a phone number of another party. The communication is received at a switch (such as a Mobile Switching Center (MSC) in GSM implementations or an Access Gateway in LTE implementations) serving the receiving telecommunications device. The switch, based upon the received dialed phone number, polls a subscriber registry (such as a Home Location Register (HLR) in GSM implementations or a Home Subscriber Server in LTE implementations) to determine, among other things, whether the called party's telecommunications device is registered on the telecommunications network and where the device is located. The switch then signals the receiving user's telecommunications device to alert it that an incoming voice communication is available for acceptance. This signaling initiates a ringtone sequence in the receiving telecommunications device and, if the user accepts the incoming call, a signal is dispatched from the receiving telecommunications device back to the switch to connect the communication to the initiating telecommunications device. In other implementations, the voice communication may be established using Circuited Switched (CS) voice over Internet Protocol (IP), similar to Unlicensed Mobile Access (UMA), or IP Multimedia Subsystem (IMS) that can include Session Initiation Protocol (SIP), as is discussed further below with reference to FIGS. 10B-10C. Additionally, as discussed above, shareable applications may already be active on the telecommunications device, may automatically start up or become active on the telecommunications device as a result of receiving a call or initiating a call, or may become active sometime after the call is established in response to some triggering event. Accordingly, block 404 may take place before, after, or concurrently with block 402.

At block 406, in some implementations, the shareable application monitors the voice communication between the telecommunications devices. For example, the shareable application monitors a conversation carried on by the users of the telecommunications devices. In some implementations, the shareable application may run in the background and only become apparent when a predetermined condition or hook is detected. In other implementations, the shareable application might present a user interface to the user of the telecommunications device for providing additional features and functions, such as for enabling the user to control the function of the shareable application in response to detecting a predetermined condition in the voice communication. However, it should be noted that in other implementations, the shareable application does not have to monitor the conversation. Instead, other triggers or inputs, or actions by the user can cause the shareable application to carryout desired functions.

At block 408, during the conversation, in some implementations, the shareable application may detect a predetermined condition in the voice communication. For example, the shareable application might detect a predetermined trigger or hook in the conversation or other aspect of the voice communication. In some implementations, for example, the shareable application might detect, such as via voice recognition functionality, a particular keyword or phrase spoken by one of the participants to the conversation, might detect a laugh, cough, sigh, or other noise made by one of the participants, or the like, and recognize this detected condition in the conversation as a trigger or hook specified as a predetermined condition for causing the shareable application to carry out a predetermined function. In an implementation, a prolonged period of silence may be a triggering event. In other implementations, the shareable application may receive a different type of input from the user or detect a different type of triggering event. For example, the user might press a button on a user interface to cause the shareable application to carry out some function.

At block 410, as a result of detecting the hook or predetermined condition, or receiving an input or other detected trigger or action of the user, the shareable application carries out the predetermined function. For example, in some implementations, the shareable application might overlay a sound effect or a jingle on the conversation, cause an image, such as an emoticon or advertisement, or other data to be received or displayed by the first telecommunications device or transmitted to the second telecommunications device, or carry out some other function, as discussed further below. After the shareable application has carried out the predetermined function, the process may return to block 406, and the shareable application continues to monitor the conversation or waits for additional user inputs or other trigger events for performing additional such functions until the voice communication is terminated.

Figure 5:
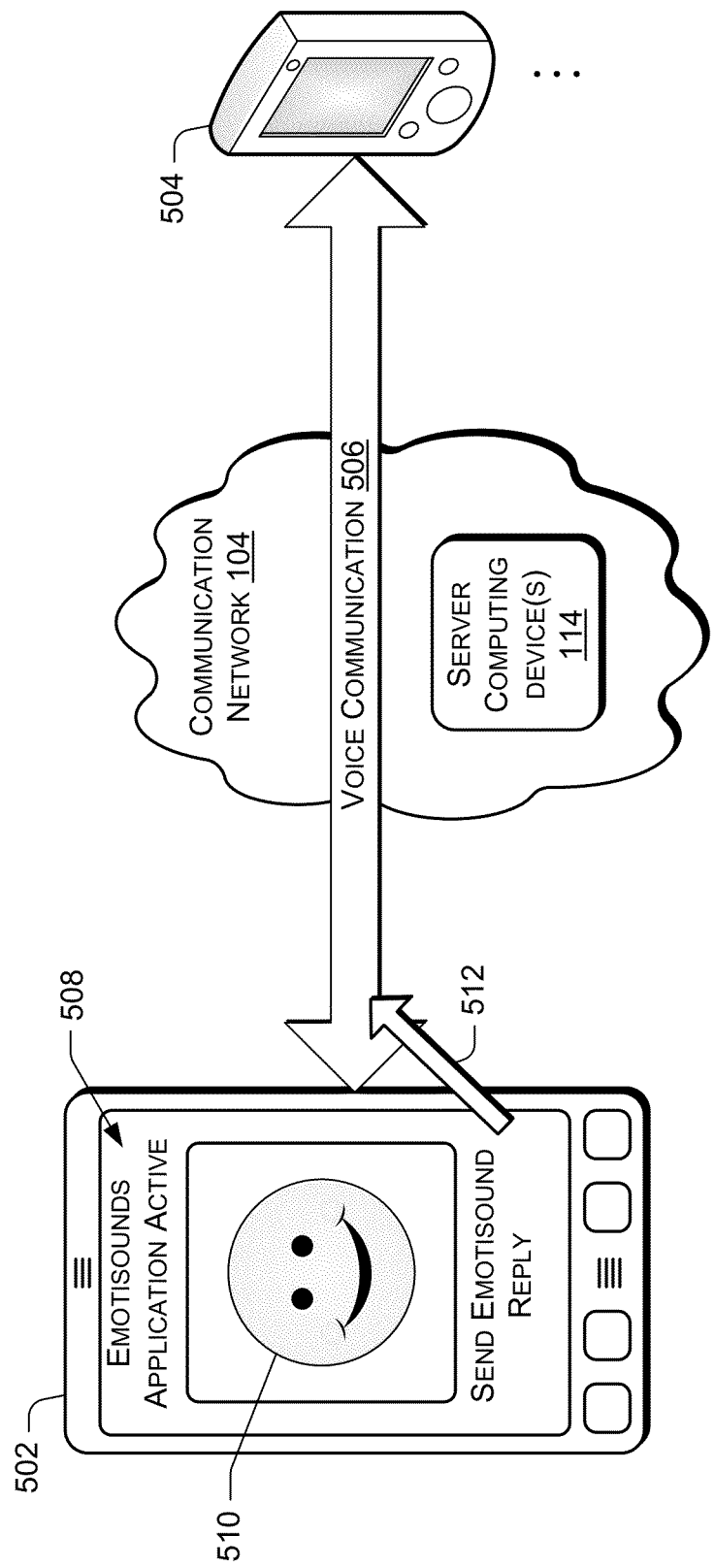
FIG. 5 illustrates an exemplary implementation of a unilateral shareable application.

FIG. 5 illustrates an exemplary implementation of a unilateral shareable application. In this implementation, a voice communication is established between a first user using a first telecommunications device 502, and a second user using a second telecommunications device 504. For example, the first user may call the second user, or vice versa, over a communications network as discussed above with reference to FIG. 1, so that a voice communication 506 is established between the first telecommunications device 502 and the second telecommunications device 504.

For discussion purposes, suppose the first telecommunications device 502 has a unilateral shareable application 508 loaded in memory and executing on a processor of the telecommunications device 502 (e.g., see FIG. 2A). Shareable application 508 may include a user interface 510 to give the user control over the functions of the shareable application 508. In the illustrated implementation, the shareable application 508 monitors the voice communication 506 between the first telecommunications device 502 and the second telecommunications device 504. When the shareable application 508 detects a particular sound, keyword, phrase, noise, or the like, as previously specified by the user of the telecommunications device 502 or by a preset in the shareable application 508 itself, the shareable application 508 performs a predetermined function in response. For example, the shareable application 508 may overlay a sound effect 512 on the voice communication 506 in response to detecting something in the voice communication. The sound effect may be practically anything, including, for example, a line from a movie, an unusual or celebrity laugh, a musical clip, a jingle, an advertisement, or the like. For instance, during the conversation, either user might laugh, which is detected by application 508 as a specified hook to cause application 508 to overlay a predetermined sound effect 512 (e.g., a laugh track) on the conversation. Accordingly, application 508 can detect the predetermined condition either from the first user's voice communication received through the microphone of the first telecommunications device 502 or from the second user's voice communication received at the first telecommunications device through the voice communication 506 from the second telecommunications device 504. As another example, the trigger event may be a non-voice-related event, such as the initial connection or acceptance of the communication at the second telecommunications device 504. For example, when the second telecommunications device 504 accepts the communication, the shareable application 508 detects that the communication has been accepted, and sends a welcome or hello message or sound effect. Thus, in these examples, shareable application 508 automatically augments the call and/or conversation with sound effects or other sound input without any additional action required of either user of either of the telecommunications devices 502, 504.

In some implementations, the shareable application 508 may carry out a function solely on the first telecommunications device 502. In this case, the sound effect 512 might only be audible to the first user of the first telecommunications device 502. In other implementations, the shareable application may send data to, or retrieve from, the other device. In such cases, the sound effect 512 might be audible only to the second user of the second telecommunications device 504, or audible to both users. In yet other implementations, the shareable application may interact directly with the voice communication so that the sound effect is heard on the voice communication by both users as a shared effect generated by the first telecommunications device 502.

Furthermore, in other implementations, the server computing device(s) 114 on the communications network 104 may provide the functionality of detecting triggers in the conversation and adding sound effects to the conversation, or the like. For example, when the shareable application 508 becomes active on the telecommunications device 502, the shareable application can notify a counterpart application on the server computing device to become active and carry out the monitoring and sound effect integration functions. Other variations will also be apparent in view of the disclosure herein.

Figure 6:
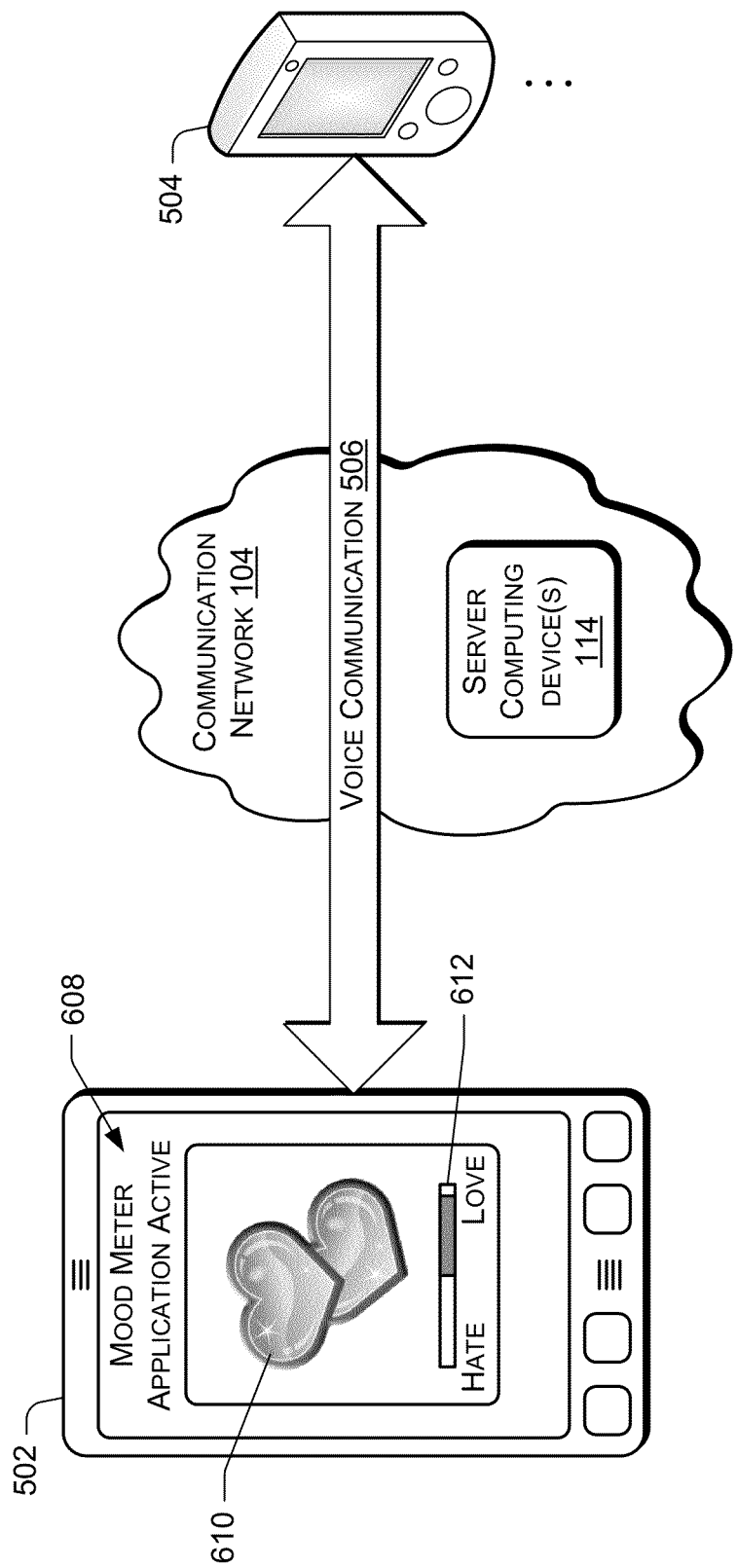
FIG. 6 illustrates another exemplary implementation of a unilateral shareable application.

FIG. 6 illustrates another exemplary implementation of a unilateral shareable application. In this implementation, a voice communication 506 is established between a first user using the first telecommunications device 502 and a second user using the second telecommunications device 504, as discussed above in the previous implementation. A shareable application 608 is loaded and executing on first telecommunications device 502. This implementation of the shareable application 608 provides a user interface 610 that includes a mood meter or "happy" meter 612. Application 608 monitors the conversation between the first user and the second user for determining the attitude of the first user and the second user towards each other based on an analysis of the tone of the conversation, and reflects the results of this analysis on the meter 612 such as by displaying a bar or other type of indicator as the meter 612, and coloring in a portion of meter 612 towards either a love position, hate position, or neutral position in the middle. In some implementations, application 608 may include artificial intelligence to analyze the tone and inflection of the first user and the second user during the conversation for determining the attitudes of the users towards each other, and automatically update the meter 612 accordingly. Furthermore, in other implementations, the server computing device(s) 114 on the communications network 104 may provide the functionality of analyzing the mood of the conversation and providing an indication of the mood to the telecommunications device. For example, when the shareable application 608 becomes active on the telecommunications device 502, the shareable application can notify a counterpart application on the server computing device to become active and carry out the monitoring and mood measuring functions. The mood measurements can be transmitted to the telecommunications device using a Session Initiation Protocol (SIP) message, or the like, as is discussed further below with reference to FIGS. 10B-10D.

Figure 7:
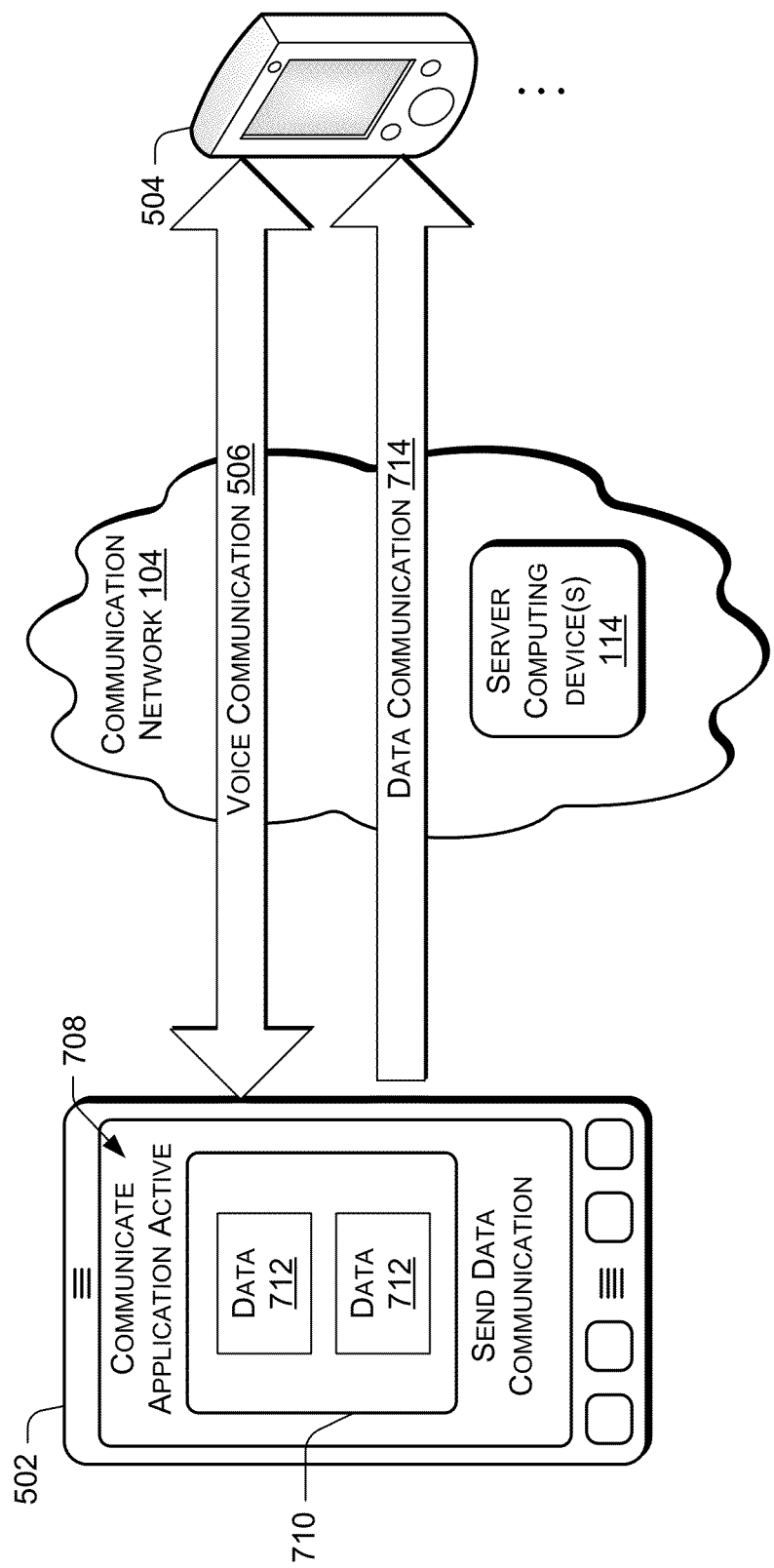
FIG. 7 illustrates another exemplary implementation of a unilateral shareable application.

FIG. 7 illustrates another exemplary implementation of a unilateral shareable application. In this implementation, a voice communication is established between a first user using the first telecommunications device 502 and a second user using the second telecommunications device 504, as discussed above in the previous implementations. A shareable application 708 is loaded and executing on first telecommunications device 502. In this implementation, shareable application 708 monitors the conversation between the first user and the second user, and automatically transmits predetermined data to telecommunications device 504 upon detecting a hook, trigger or other predetermined condition in the conversation, such as a keyword, laugh, or other sound. For example, shareable application 708 may include a user interface 710 that displays one or more pieces of data 712 such as icons, emoticons, photographs, or other suitable data. When the predetermined condition in the conversation is detected by the shareable application 708, the shareable application 708 identifies a predetermined piece of data 712 that corresponds to the detected predetermined condition, and then sends the corresponding piece of data 712 to the second telecommunications device 504 as a data communication 714. In some implementations, data communication 714 may be in the form of a text message (e.g., SMS), picture message (e.g., MMS), instant message (IM) or other suitable data communication format. As a particular example, one of the users may laugh, and application 708 detects the laugh and in response, sends an image of a smiley face emoticon to the second telecommunications device 504 as a data communication 504. Furthermore, in other implementations, the server computing device(s) 114 on the communications network 104 may provide the functionality of detecting triggers in the conversation and sending the data pieces 712 in the data communication 714. For example, when the shareable application 708 becomes active on the telecommunications device 502, the shareable application can notify a counterpart application on the server computing device 114 to become active and carryout the monitoring and data sending functions. Other variations will also be apparent in view of the disclosure herein.

In some additional implementations, a variety of user-selectable sounds and visuals may be initiated and shared between telecommunications devices 502, 504 via user initiation. For instance, if the user of telecommunications device 502 wishes to respond to a comment made by the other user with a smiling emoticon, such as emoticon 510, the user may initiate a process by which emoticon 510 appears on the second telecommunications device 504. In some implementations, emoticon 510 consists of an image file resident on telecommunications device 502, which may be transmitted to telecommunications device 504 in the form of an MMS message, SIP message, or the like. The message includes, in one or more data fields accompanying the emoticon image, a predefined alphanumeric trigger which, upon receipt by telecommunications device 504, would initiate the immediate presentation of emoticon 510 on a display. In this manner may any type of multimedia content capable of transmission via MMS or SIP can be transmitted and presented on telecommunications device 504.

Additionally, in some bilateral implementations, as described further below, presentable content, such as but not limited to emoticon images, may reside in the memory of each of telecommunications devices 502, 504. If the user of telecommunications device 502 wishes to "send" an emoticon image to the user of telecommunications device 504, the shareable application, upon receiving an input from the user can automatically initiate transmission of a SMS, MMS or SIP message to telecommunications device 504, which message would incorporate a trigger, such as an alphanumeric trigger in one or more fields of such message. Upon receiving the message, the shareable application resident on the second telecommunications device 504 would identify and recognize the trigger, associate the trigger with a particular emoticon image, and immediately present the particular emoticon image on the display of second telecommunications device 504. By storing emoticons and other multimedia content in the memory of each of telecommunications device 502, 504, and triggering display of such content via messaging triggers rather than passing the actual image file, a telecommunications carrier can minimize network data traffic.

Figure 8:
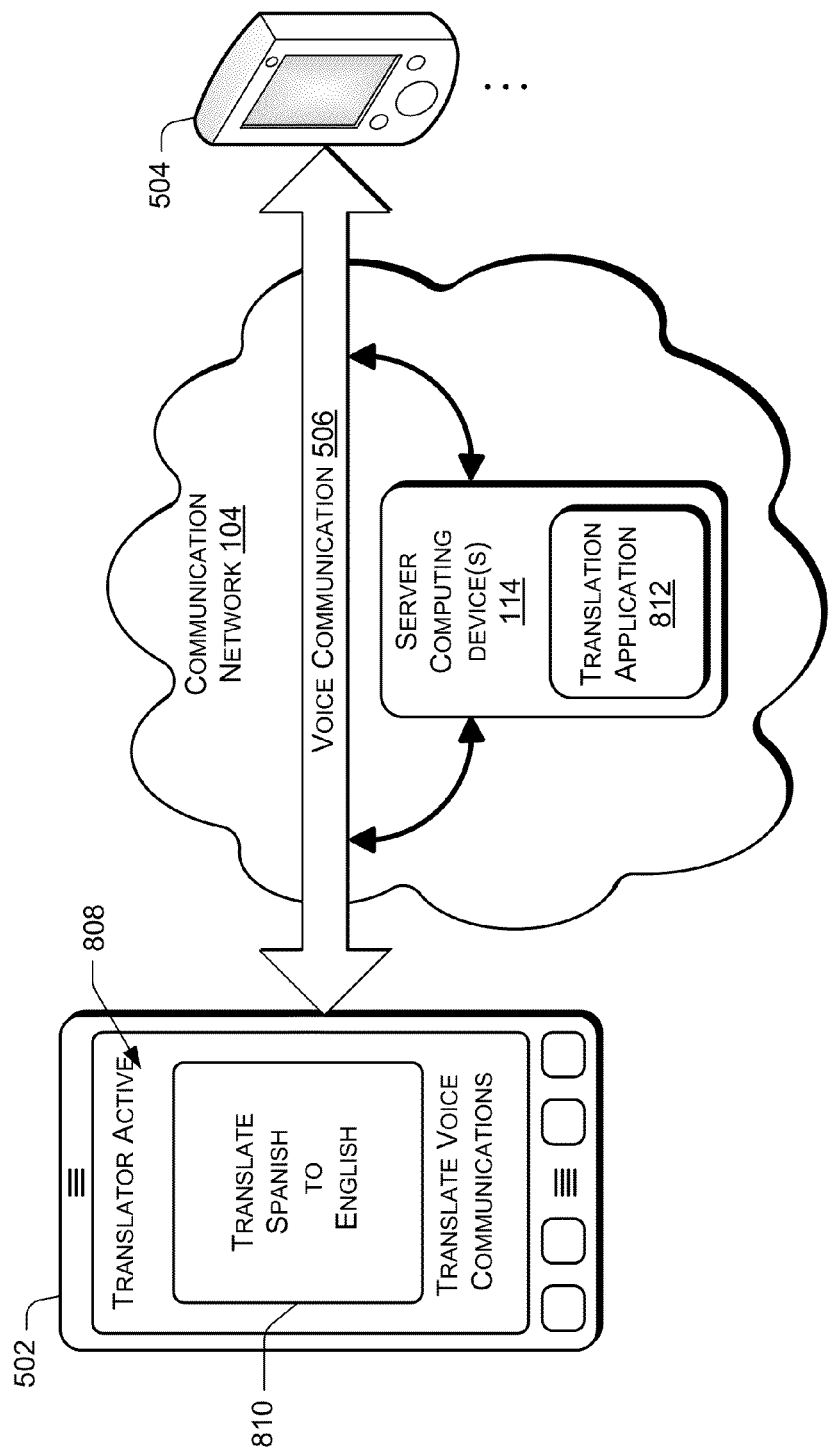
FIG. 8 illustrates another exemplary implementation of a unilateral shareable application.

FIG. 8 illustrates another exemplary implementation of a unilateral shareable application. In this implementation, a shareable application 808 is loaded and executing on first telecommunications device 502 to monitor the conversation between the first user and the second user, and automatically translates the conversation, or portions thereof, from one language to another. For instance, application 808 may include a user interface 810 that displays the language being spoken and the language into which the spoken language is to be translated. In some implementations, for example, if the user of the first telecommunications device 502 is placing a call to the user of the second telecommunications device 504 knowing that the user of the second telecommunications device speaks Spanish, while the first user speaks English, the user of the first telecommunications device 502 may implement shareable application 808 to translate outgoing communications from English to Spanish and translate incoming communications from Spanish to English. This may be carried out, for example, using voice recognition technology to recognize the incoming words in Spanish, perform the translation to English, and then use computer-generated speech to produce the translated English words in an audible format, with the outgoing communications being translated in a reverse manner. Further in some implementations, in addition to or instead of producing computer-generated speech, the translated words may be displayed in user interface 810.

In addition, as discussed above, a server computing device(s) 114 on the network may facilitate the implementation of the translation application. For example, in order to take advantage of the greater processing power and memory of server computing device(s) 114, the voice recognition and translation can be carried out by a counterpart translation application 812 executing on one or more of server computing devices 114. This would enable the translation to be carried out in much closer to real time than would be possible with a conventional telecommunications device having conventional processing power. Thus, when the shareable translation application 808 becomes active on telecommunications device 502, the translation application 808 notifies the counterpart translation application 812 on the server computing device(s) 114 to become active and carry out the actual voice recognition, translation and speech generation functions.

Further, in other implementations, the translation application 808 may be a bilateral application in which each telecommunications device 502, 504 has an instance of the application active. For example, some parts of the application, such as computer speech generation may take place at each telecommunications device, while the voice recognition and translation portions may take place at the server computing device(s) 114. Other variations will also be apparent to those of skill in the art in light of the disclosure herein.

In other implementations, shareable application 808 and/or counterpart translation application 812 runs in the background, and, for example, when one or more non-English-language words are detected during a conversation between the first user of the first communication device 502 and the second user of the second telecommunications device 504, application 808 or 812 may automatically produce a computer-generated speech and/or written translation of the one or more non-English-language words into English, or whatever language the first user specifies.

While several exemplary implementations of unilateral shareable applications have been described above, it will be apparent to those of skill in the art that many other implementations are possible in view of the disclosure set forth herein, and that the implementations herein are not limited to the particular examples described. Additionally, while the unilateral applications have been described in the environment of a voice communication between a first telecommunications device and the second telecommunications device, it will be appreciated that some of the applications described herein can also be applied in other communication environments, such as a telecommunications device with a voice over IP device, a landline telecommunications device, or the like, in place of the second telecommunications device. Additionally, in some implementations, more than one shareable application can be executing on the telecommunications device, such as for monitoring the voice communications and/or performing desired functions.

Implementations of Bilateral Shareable Applications

Figure 9:
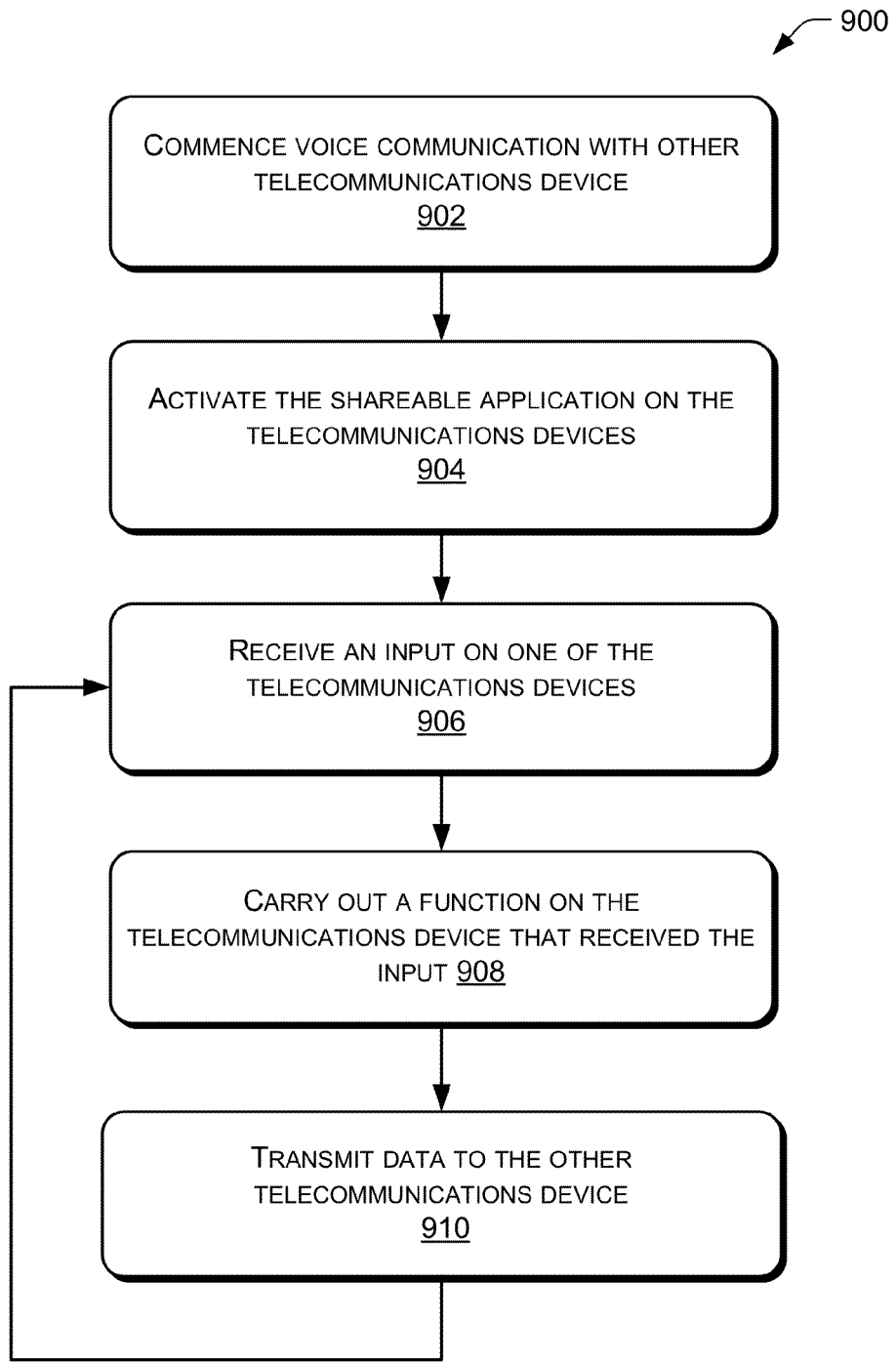
FIG. 9 illustrates a flow chart representing an exemplary process carried out in conjunction with execution of implementations of bilateral shareable applications.

FIG. 9 illustrates a flow chart representing an exemplary implementation of a process 900 carried out in conjunction with execution of implementations of bilateral shareable applications on telecommunications devices.

At block 902, a voice communication is established between two or more telecommunications devices for enabling voice communications to be carried out between the telecommunications devices. For example, one of the telecommunications devices may initiate an outgoing call, or receive an incoming call.

At block 904, the shareable application is activated on two or more of the telecommunications devices that are connected by the voice communication. For example, each user might already have the shareable application installed on his or her telecommunications device. In other implementations, one of the users might encourage the other user(s) to install the application on their respective devices, so that the users are able to interact with each other via the shareable application. In yet other implementations, the application on one or both telecommunications devices may open automatically in response to a communication being connected, being accepted or other trigger event. For example, the application on one telecommunications device may run in the background and automatically recognize the phone number of the other telecommunications device as being a telecommunications device with which the shareable application has interacted in the past. The shareable application can automatically become active and initiate opening a data communication with the other telecommunications device, which may cause a shareable application on the other telecommunications device to also become active. Other variations will also be apparent to those of skill in the art in light of the disclosure herein. In any event, if the users decide that they would like to activate a shareable application, the first user activates an instance of the shareable application on the first user's telecommunications device and the second user activates a separate instance of the shareable application on the second user's telecommunications device while the voice communication remains active so that the users may continue to converse. In some implementations, the shareable application on each telecommunications device automatically establishes a data communication with the sharable application on the other telecommunications device that is party to the voice communication. However, in some other implementations, the users may elect not to have this interconnection between the applications, or the applications may not need an established data communication to operate.

At block 906, the shareable application active on one of the devices receives an input. For example, the first user may make an input to a user interface of the first shareable application on the first telecommunications device, or the second user may make an input to the user interface of the second shareable application on the second telecommunications device.

At block 908, the shareable application on the telecommunications device that receives the input carries out a corresponding function on the telecommunications device.

At block 910, in some implementations, the shareable application on the telecommunications device that receives the input transmits data to the shareable application on the other telecommunications device. For instance, the shareable application that received the input might transmit instructions for instructing the shareable application on the other telecommunications device to also carry out a function. Then, for example, the shareable application on the other telecommunications device receives the instructions from the shareable application on the telecommunications device that received the user input, and carries out the corresponding function on the other telecommunications device in accordance with the instructions received from shareable application on the telecommunications device that received the user input.

Furthermore, in some implementations, the shareable applications may be more closely linked to each other via the data communication. For example, in some implementations, one of the shareable applications on one of the telecommunications devices may be a master application while the other shareable application on the other device may be controlled as a slave application, such that the user of the master telecommunications device controls the applications on both telecommunications devices. This may be useful, for example, in some implementations, such as where a parent using the master telecommunications device is reading an e-book to a child using the slave telecommunications device. Other examples in which such master-slave shareable applications are useful include an application for presenting slides, such as during a conference call or the like.

Further, in some applications in which the master-slave relationship is implemented, a toggle might be included for switching the role of master and slave between the telecommunications devices. For example, the user interface of each telecommunications device may include a switch or button displayed on the user interface, for switching one of the telecommunications devices from the master role to the slave role and vice versa. Additionally, in some implementations, the roles might be switched after a predetermined time, or upon the occurrence of a particular user input. For example, during a game, the role might be switched each time a player makes a move or chooses an option.

Additionally, in some implementations, the bilateral shareable applications produce a common visual display that is the same on each telecommunications device, while in other implementations, the bilateral shareable applications have no common space or shared environment. For example, as discussed above, if the user of the first telecommunications device wishes to "send" an emoticon image to the user of the second telecommunications device, whether this image is actually sent, or whether just an instruction to load a particular emoticon image is sent, this can be carried out using single instance messages, and thus, no shared or common environment is necessary. However, in other bilateral shareable applications, a common or shared space is created, such as for enabling the users to both view the same photograph simultaneously on each telecommunications device, or the like. In some implementations, each user is able to manipulate the common environment, while in other implementations, such as the master-slave implementations described above, only one of the users is able to manipulate the common environment at any one time. Other variations will also be apparent in light of the disclosure herein.

Figure 10A:
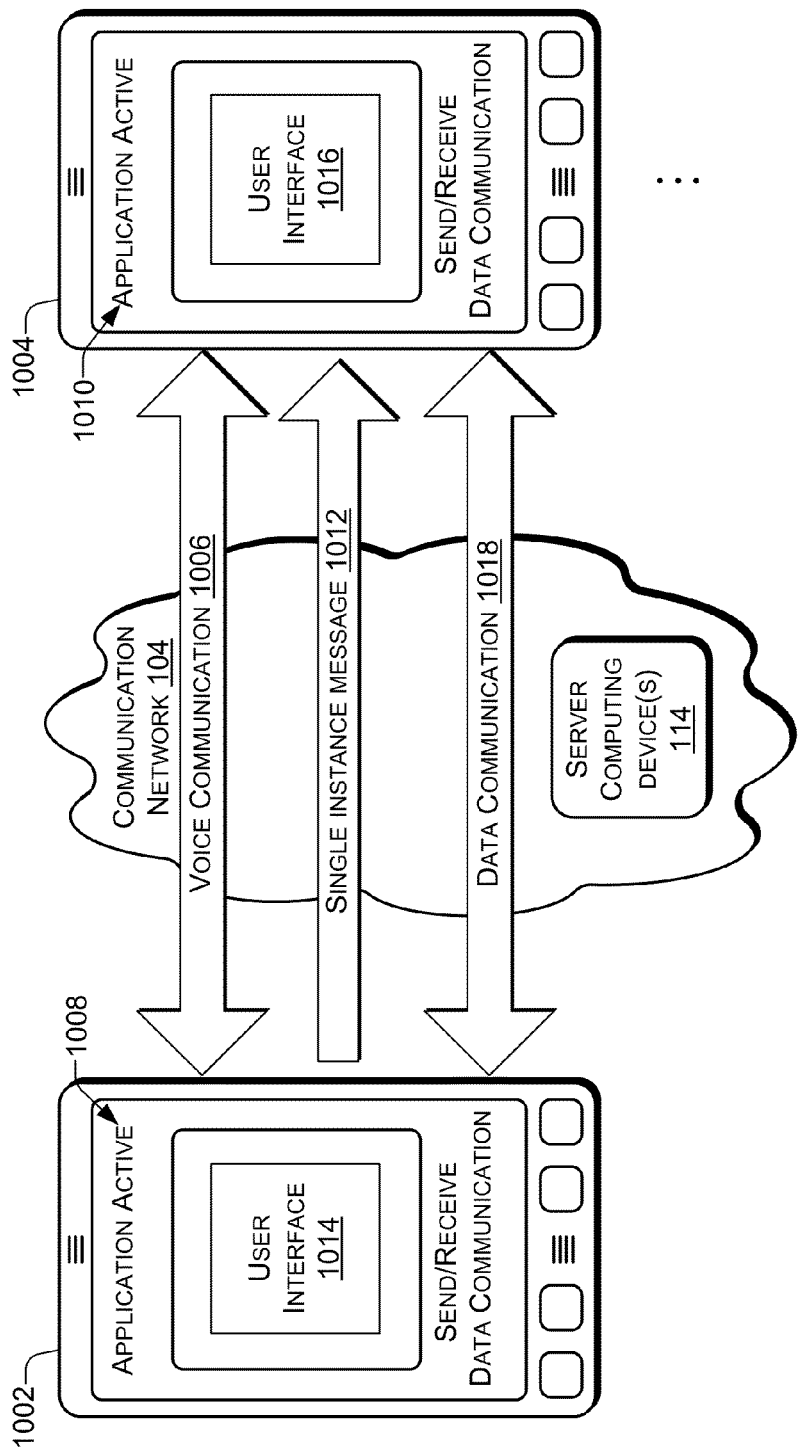
FIG. 10A illustrates an exemplary implementation of a bilateral shareable application.

FIG. 10A illustrates an exemplary implementation of bilateral shareable applications. In the illustrated implementation, a voice communication is established between two or more telecommunications devices, such as a first user using a first telecommunications device 1002, and a second user using a second telecommunications device 1004. For example, the first user may call the second user or vice versa, over a communications network as discussed above with reference to FIG. 1, so that a voice communication 1006 is established between the first telecommunications device 1002 and the second telecommunications device 1004. First telecommunications device 1002 may have a first bilateral shareable application 1008 loaded in memory and executing on the first telecommunications device, such as by being executed by one or more processors of the first telecommunications device, as discussed above with reference to FIGS. 2A-2B. Similarly, a second telecommunications device 1004 may have a second bilateral shareable application 1010 loaded in memory and executing on the second telecommunications device, such as by being executed by one or more processors of the second telecommunications device, as discussed above with reference to FIGS. 2A-2B. First application 1008 may include a first user interface 1014 to give the first user control over the functions of the first application 1008. Similarly, second application 1010 may include a second user interface 1016 to give the second user control over the functions of the second application 1010.

In the illustrated implementation, during the voice communication between the first user and the second user, the users decide to activate the application 1008, 1010 on their respective telecommunications devices 1002, 1004. In other implementations, as discussed above, the shareable application on one or both telecommunications devices may open automatically in response to a communication being placed, received, accepted or some other trigger event. In some implementations, after the application on each telecommunications device 1002, 1004 has been activated, the users may continue their conversation while each uses the application on their respective telecommunications device 1002, 1004, thereby sharing the experience of using the applications together while also conversing over the voice communication 1006. Additionally, in some implementations, as described above, a single instance message 1012 may be sent from one of the telecommunications devices 1002, 1004 to the other telecommunications device, such as in the example described above for causing an emoticon image to load on the other telecommunications device. As described above, the single instance message could be an SMS message, a MMS message, SIP message, or the like.

In some implementations, however, additional functions are obtained when a data communication 1018 is established between the shareable applications 1008, 1010 to facilitate more constant exchange of data. Thus, in these implementations, when the shareable applications 1008, 1010 have been activated, each shareable application may automatically locate and connect to the corresponding shareable application on the other telecommunications device, thereby establishing the data communication 1018 between the first telecommunications device 1002 and the second telecommunications device 1004. Data communication 1018 may be established in a variety of different ways with no additional input or action required from the first or second user of telecommunications devices 1002, 1004. For example, each application 1008, 1010 on telecommunications devices 1002, 1004, respectively, may establish a connection with the Internet such as through the network service provider via the radio transceiver interface, or through a Wi-Fi or other connection, if available. Then, each telecommunications device may determine its own IP address, and either transmit this address to the other telecommunications device or request the network service provider to transmit the IP address to the other telecommunications device or obtain the IP address from the other telecommunications device. For example, in one implementation, the IP addresses may be exchanged over the voice communication itself using key tones or other communication techniques. In another implementation, the application can request the network service provider servers provide the respective IP addresses of each telecommunications device 1002, 1004 to the other telecommunications device. This process is simplified when both telecommunications devices are using the same wireless network. However, when first telecommunications device 1002 is on a first wireless network and second telecommunications device 1004 is on a second wireless network, the exchange of IP addresses may still be accomplished by using an IP multimedia system operated by each respective wireless network. Once the data communication 1018 has been established by the exchange of IP addresses the applications 1008, 1010 are able to interact with each other and exchange data with each other for carrying out a multiplicity of functions and operations, some examples of which are provided below.

Figure 10B:
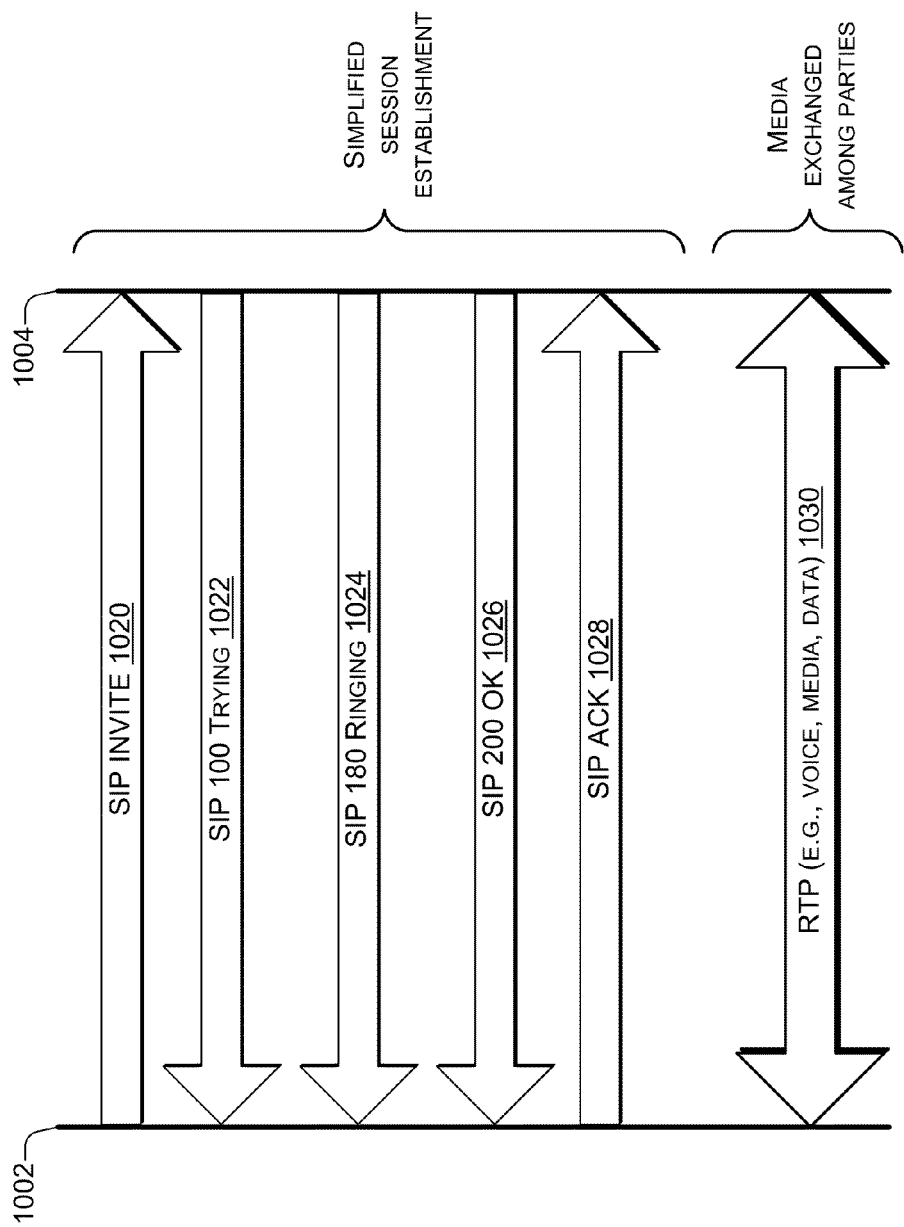
FIG. 10B illustrates an exemplary implementation of establishing a connection for a shareable application.
Figure 10C:
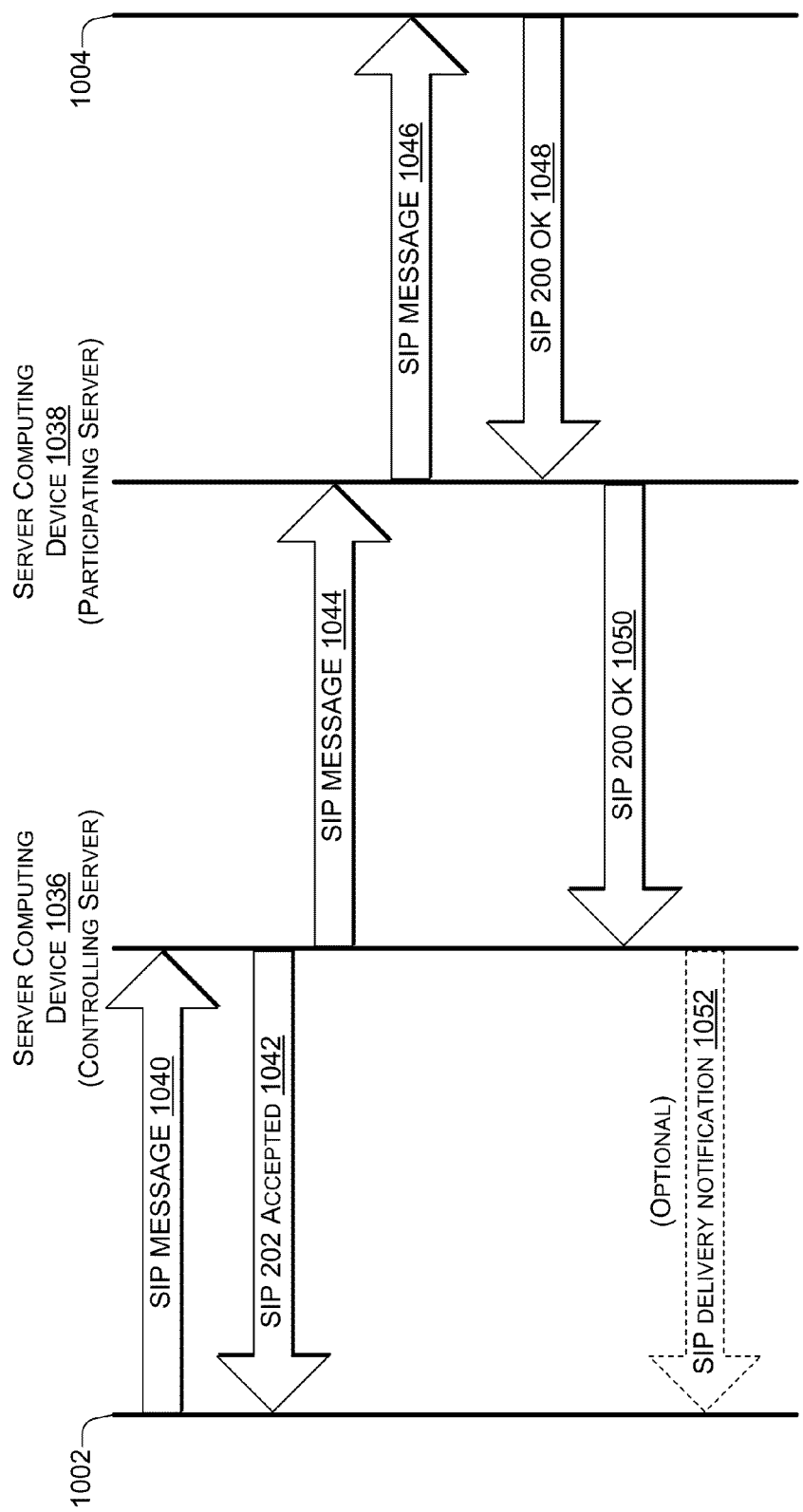
FIG. 10C illustrates another exemplary implementation of establishing a connection for a shareable application.
Figure 10D:
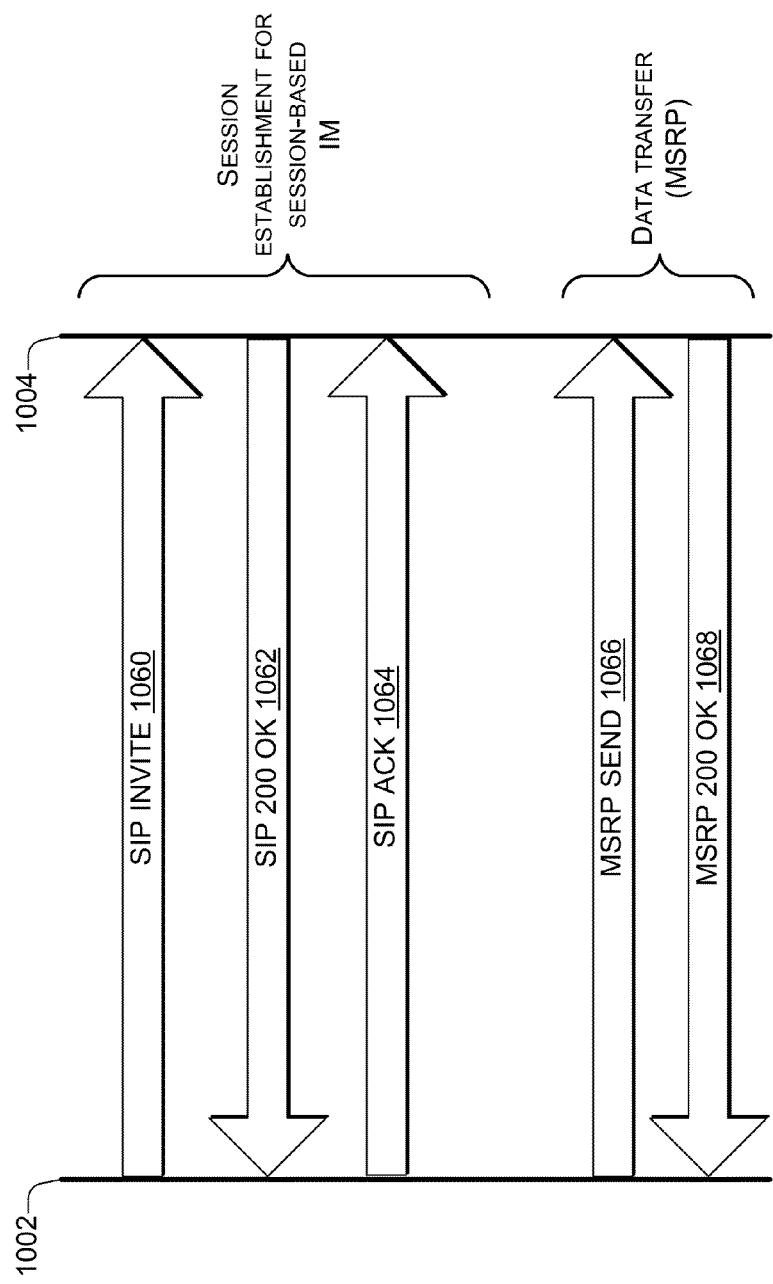
FIG. 10D illustrates another exemplary implementation of establishing a connection for a shareable application.

FIGS. 10B-10D set forth several additional exemplary processes for enabling data communication between two or more telecommunications devices 1002, 1004, such as for single instance messaging or for opening a data communication for exchange of data, instructions, or the like. For example, Session Initiation Protocol (SIP), as defined by the Internet Engineering Task Force (IETF) Network Working Group, can be used for exchanging data and/or establishing several types of connections between two or more telecommunications devices. SIP is a signaling protocol that is typically used for enabling multimedia communication sessions, such as voice and video calls over Internet Protocol (IP). SIP is part of the IP Multimedia Subsystem (IMS) established as a framework for enabling access to multimedia and voice applications from wireless and wired line devices. The SIP protocol can be used for creating multiparty sessions consisting of one or several communication or data streams.

In the implementation illustrated in FIG. 10B, after the voice communication 1006 is established between the telecommunications devices 1002, 1004, SIP can be used to establish Real-time Transport Protocol (RTP) communication between the two or more telecommunications devices. It should be noted that SIP/IMS registration is performed prior to this message exchange, as currently defined in RFC 3261 by the IETF and as refined by 3GPP (3rd Generation Partnership Project) as part of IMS. In the simplified message exchange illustrated, a SIP INVITE message is sent from one of the telecommunications devices 1002 to the other telecommunications device 1004 via the communications network 104. In response, the second telecommunications device 1004 sends a SIP 100 Trying message 1022, a SIP 180 Ringing message 1024, and then a SIP 200 OK message 1026 when the connection is established. The first telecommunications device 1002 sends back a SIP ACK message 1028 to acknowledge the session establishment. Once the SIP session is established, the telecommunications devices 1002, 1004 can exchange a variety of data via RTP 1030. For example, audio files, video, images, instructions, or other data may be exchanged using RTP.

FIG. 10C illustrates an alternative implementation in which independent messages can be sent using SIP without actually having to establish a session between the two or more telecommunications devices 1002, 1004. This implementation may be referred to as a "pager mode", and makes use of one or more server computing devices 1036, 1038, which may correspond to server computing device(s) 114 discussed above, and which may be NSP servers, or the like. The first telecommunications device 1002 sends a message as a SIP message 1040. The SIP message is received by a first server computing device 1036 as the controller server and the first server computing device sends back a SIP 202 accepted message 1042 as an acknowledgment to the first telecommunications device 1002. The first server computing device passes the message as a SIP message 1044 to a second server computing device 1038 as the participating server in communication with the second telecommunications device 1004. The second server computing device 1038 passes the message as SIP message 1046 to the second telecommunications device 1004. Since a call is in progress between the two telecommunications devices, the message is not deferred. The second telecommunications device 1004 sends back a SIP 200 OK message 1048 to the second server computing device 1038 to acknowledge the receipt of the message, and the second server computing device 1038 passes the acknowledgment as SIP 200 OK message 1050 to the first server computing device 1036. The first server computing device 1036 may optionally send a SIP delivery notification message 1052 to the first telecommunications device 1002. The message received by the second telecommunications device 1004 may be used for various different uses in shareable applications, such as providing instructions from a shareable application on one telecommunications device to a shareable application on a second telecommunications device.

FIG. 10D illustrates another implementation in which SIP is used to set up a Message Session Relay Protocol (MSRP) session. MSRP is conventionally used for transmitting instant messages. However, in implementations herein, shareable applications can use MSRP to transmit data including arbitrarily large and independent instant messages that can be used to transfer large files, such as media files. A SIP INVITE message 1060 is sent from the first telecommunications device 1002 to the second telecommunications device 1004. The second telecommunications device 1004 responds with a SIP 200 OK message 1062. The first telecommunications device 1002 responds with a SIP ACK message 1064 to acknowledge that the session is established. The first telecommunications device 1002 sends an MSRP SEND message 1066 that includes the data desired to be transferred to the second telecommunications device 1004. The second telecommunications device 1004 sends back an MSRP 200 OK message 1068 to acknowledge receipt of the message. Once the message has been transferred from the sender to the receiver, the MSRP session is closed. Accordingly, the foregoing sets forth several examples of implementations for exchanging data between telecommunications devices during an ongoing voice communication. Further, while exemplary implementations have been described for enabling data communication during an ongoing voice communication, other implementations are also possible, and the disclosure is not limited to the specific examples described herein.

Figure 11:
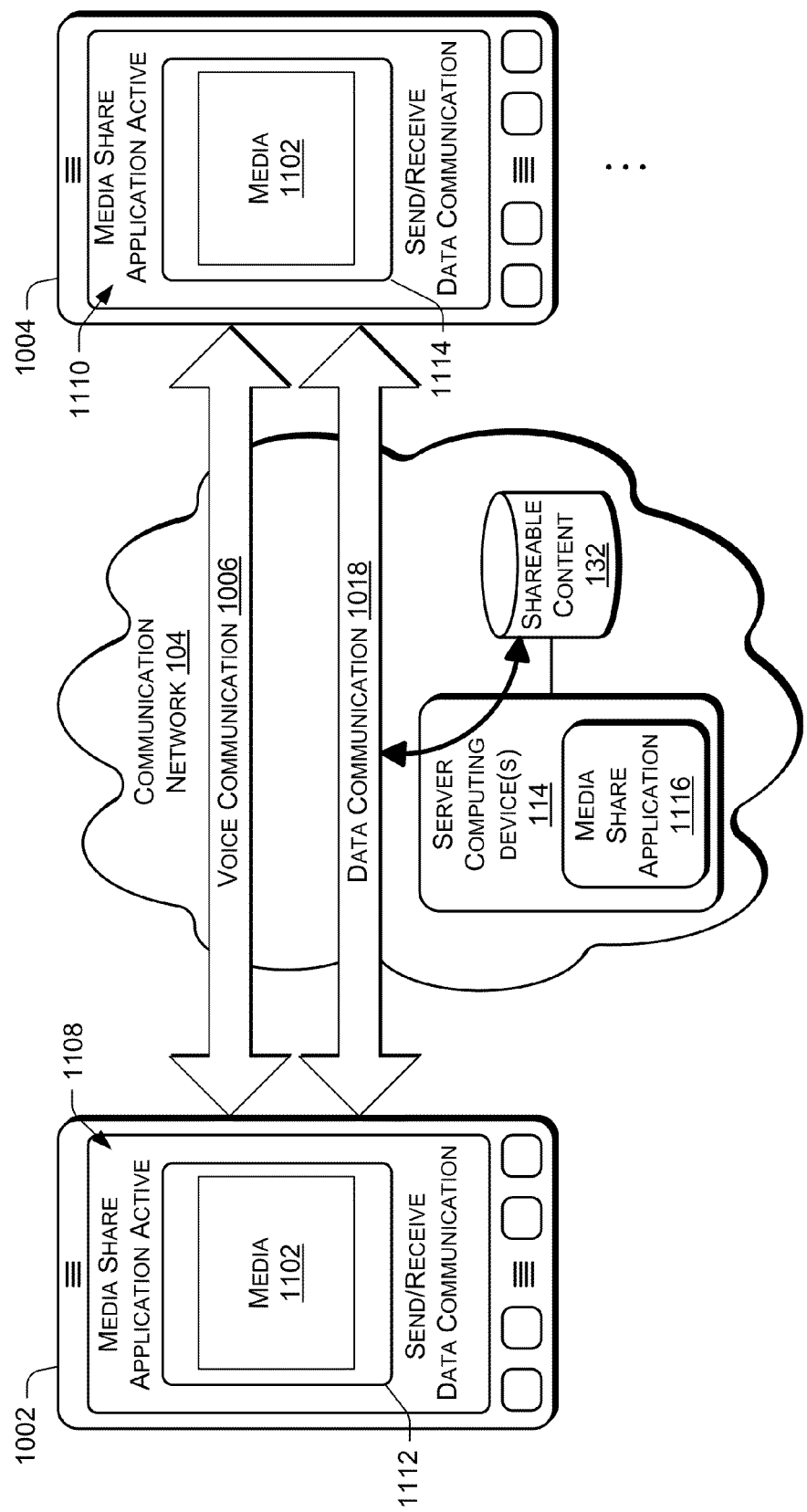
FIG. 11 illustrates another exemplary implementation of a bilateral shareable application.

FIG. 11 illustrates an example of an implementation of a bilateral shareable application which enables a first user and the second user to simultaneously view and/or listen to media 1102, such as such as photographs, music, videos, or the like, while carrying on a voice communication. For example, once the data communication 1018 is established between the first media shareable application 1108 and the second media shareable application 1110, one of the applications 1108, 1110 may transmit one or more media files, such as a photograph to the other application so that both users are able to view the same photograph simultaneously while discussing the photograph over the voice communication 1006. As illustrated in FIG. 11, media 1102, such as a photograph, video, cover art, or the like, is displayed on a user interface 1112, 1114, respectively, of both the first telecommunications device 1002 and the second telecommunications device 1004.

Furthermore, the shareable applications 1108, 1110 may interact with a corresponding shareable application module 1116 on the server computing device(s) 114. For example, when media shareable applications 1108, 1110 become active on the telecommunications devices 1002, 1004, respectively, media share application 1116 on server computing device(s) 114 may manage and coordinate the transmission of shareable content to each of the telecommunications devices 1002, 1004. For instance, if the first user of first telecommunications device 1002 wants to share media, such as photographs, music, videos or the like with the user of second telecommunications device 1004, the first user can store the media in storage accessible and/or managed by the server computing device(s) 114. Thus, an online website, or other storage site may be used to store the shareable content. Then, when sharing the content, the shareable content 132 can be downloaded, served, streamed, or otherwise transmitted to each of the first and second telecommunications devices in a coordinated manner so that each user receives the shareable content at the same or substantially the same time. In this manner, the owner of the content does not have to use storage space on his or her telecommunications device for storing the content. Further, if the content is subject to digital rights management (DRM), the DRM provisions can also be enforced by the server computing device(s) 114.

As a specific example, in the case of photographs, the first user of the first telecommunications device may store a series of photographs online in shareable content 132. During a telephone conversation, the first user of first telecommunications device 1002 wants to share these photographs with the user of second telecommunications device 1004. The users each start up the media share shareable application 1108, 1110 on their respective telecommunications devices (or the media share applications may be started automatically). The media share application 1116 on the server computing device interacts with the applications 1108, 1110 on the telecommunications device, for transmitting and displaying the photographs sequentially on the respective user interfaces 1112, 1114. In some implementations, each user at each telecommunications device 1002, 1004 controls the user interface to determine when to move on to the next photograph. However, in other implementations of shareable application 1108, 1110, a master-slave relationship may be desirable between the shareable applications 1108, 1110. For example, the shareable application on the telecommunications device of the owner of the photographs (or from which the photographs are being transferred in the non-network storage implementation) may control the operation of the shareable application on the other telecommunications device that is receiving the photographs. Thus, the user of telecommunications device that owns the photographs, or that transfers photographs to the other telecommunications device can also control when each photograph is transferred or viewed so that each photograph may be discussed in turn. Furthermore, the photographs may be transferred one at a time, as they are discussed, or all the photographs may be transferred at once, and the applications 1108, 1110 are then used to control when each of the photographs are displayed. Other variations will also be apparent to those of skill in the art in light of the disclosure herein.

As another example, instead of photographs, images of slides for a presentation might be transferred from one telecommunications device to the other, or from shareable content 132. Thus, the user of one of the telecommunications devices 1002, 1004 is able to conduct a presentation of slides, or other images, to the user of the other telecommunications device 1002, 1004, while simultaneously describing the slides using the voice communication 1006. Similar to the photographs, the slides may be transferred as they are discussed, or may be transferred all at once and the applications 1108, 1110 can be coordinated to control the timing of the presentation of each slide 1102, such as via a master-salve relationship.

In yet another example, the shareable media content might be a movie or music track, or other media type that requires payment in order to view or hear. Thus, the server computing device(s) 114 could also charge the users, bill the users, and/or receive payment from the users of the first and/or second telecommunications devices 1002, 1004 for delivering the media content to the telecommunications devices 1002, 1004, respectively. The server computing device(s) 114 may also manage the digital rights for the media content, as discussed above. Further, in some implementations, the server computing device(s) 114 can handle backend conversion of the media content prior to downloading the content to the telecommunications devices, such as conversion of the media content to small-form-factor-compatible format, compression or decompression of the content, or other format compatible with a particular telecommunications device. Additionally, while the illustrated implementation shows the use of an established data communication, in other implementations, single instance messages, as described above, may be used in place of the established data communication 1018.

Figure 12:
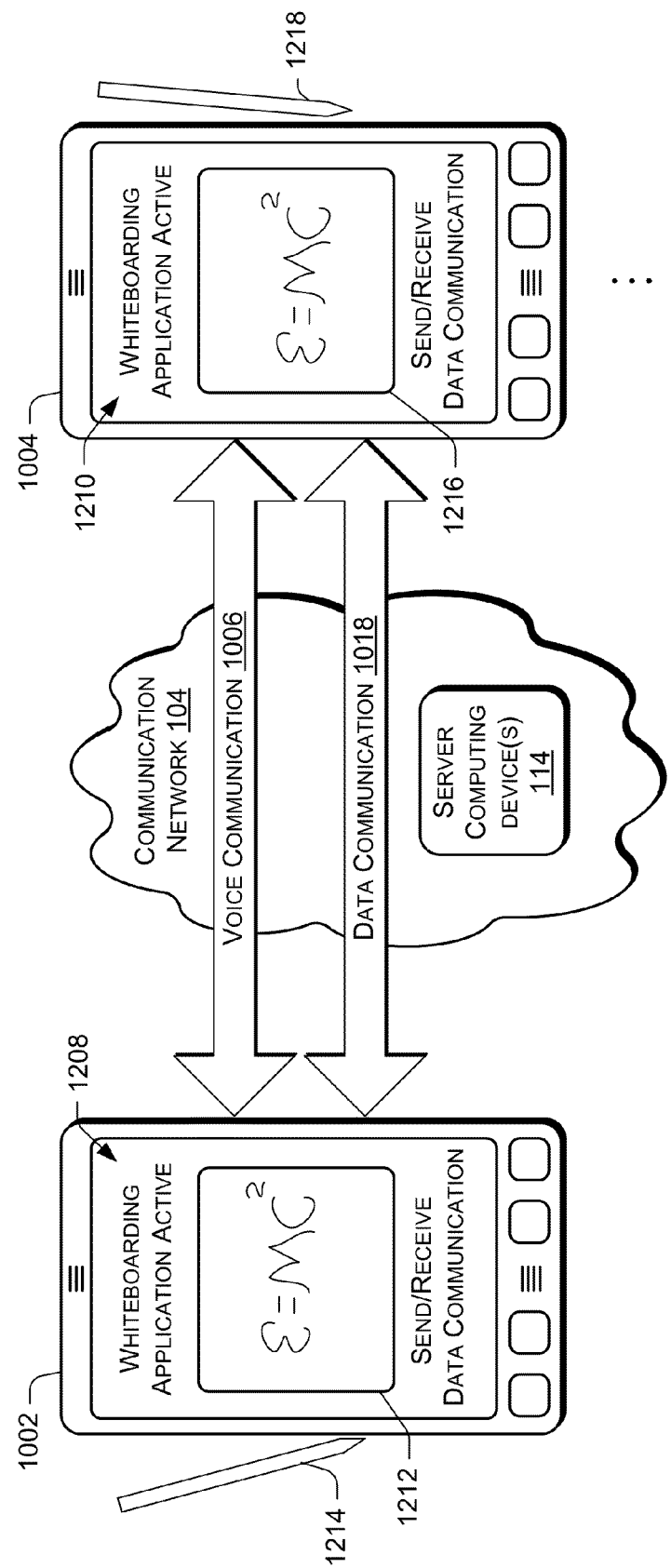
FIG. 12 illustrates another exemplary implementation of a bilateral shareable application.

FIG. 12 illustrates another example of an implementation of a bilateral shareable application. In this implementation, one or both of the telecommunications devices 1002, 1004 are equipped with a touchscreen and stylus for entering freehand inputs, and shareable applications 1208, 1210 may include whiteboarding capabilities. For example, the first telecommunications device 1002 includes a first whiteboarding user interface 1212 and first stylus 1214, and the second telecommunications device 1004 includes a second whiteboarding user interface 1216 and second stylus 1218. Further, in some implementations, a user's finger may serve as a stylus. Using the styluses 1214, 1218, one or both of the users are able to enter handwritten or other types of inputs that are automatically transmitted over the data communication 1018 and displayed on the whiteboard interface 1202, 1206, respectively, of the other telecommunications device 1002, 1004, respectively, while the users are simultaneously able to discuss the inputs over the voice communication 1006. Additionally, while the illustrated implementation shows the use of an established data communication, in other implementations, single instance messages, as described above, may be used in place of the established data communication 1018. Further, in some implementations, server computing device(s) 114 may facilitate the shareable applications 1208, 1210, such as by storing the content created by the shareable applications 1208, 1210 in an online location for later access by the telecommunications devices 1002, 1004.

Figure 13:
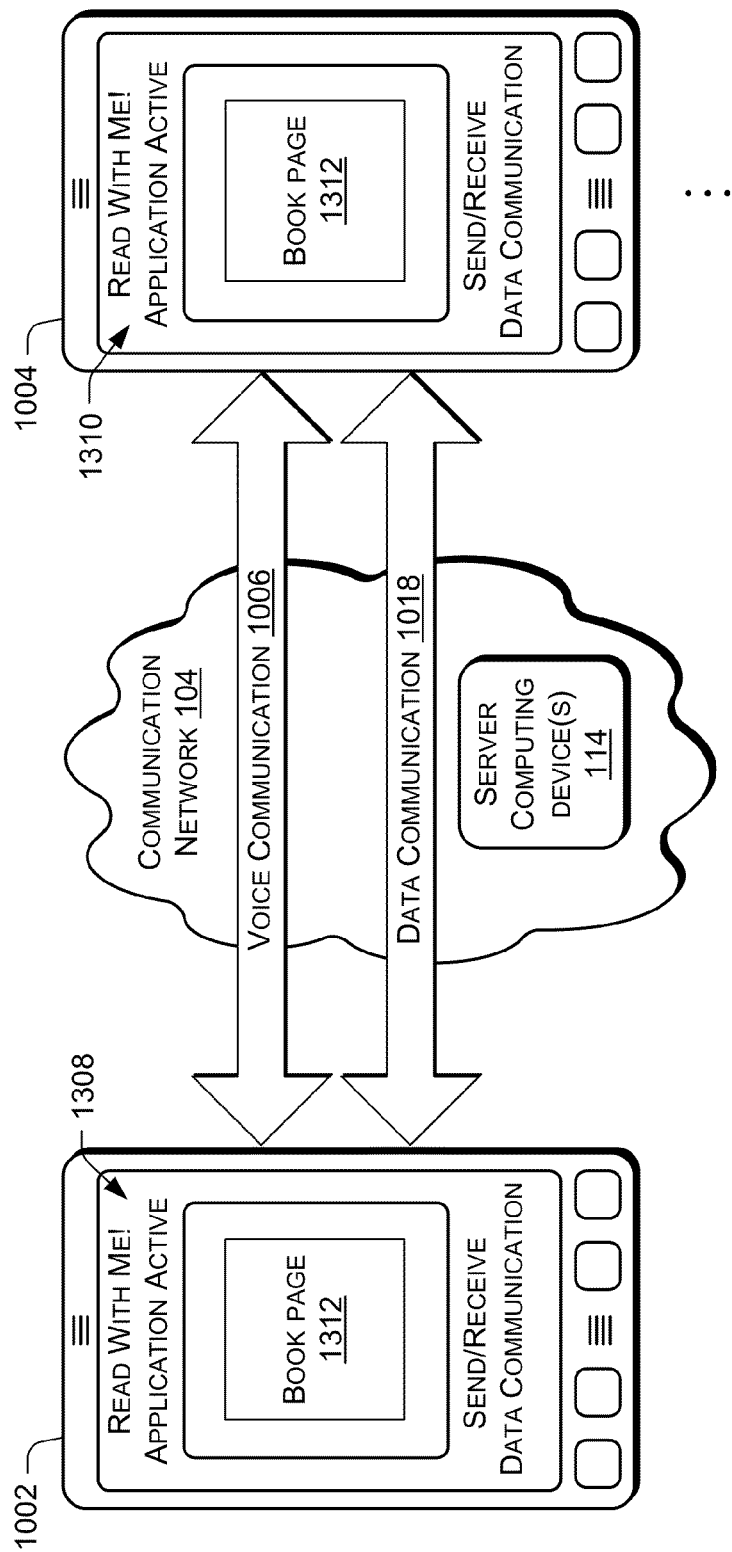
FIG. 13 illustrates another exemplary implementation of a bilateral shareable application.

FIG. 13 illustrates another example of an implementation of a bilateral shareable application. In this example, the user of one of the telecommunications devices 1002, 1004 is able to read an electronic book to the user of the other telecommunications device 1002, 1004. For example, a parent who is out of town could use this shareable application to read a book to his or her child before bedtime. Thus, the shareable applications 1308, 1310 control the display of each page 1312 of the book on each telecommunications device 1002, 1004. This application also lends itself to a master-slave relationship for the applications 1008, 1010, so that the parent is able to control when the next page of the book is displayed on the child's telecommunications device. Additionally, while the illustrated implementation shows the use an established data communication, in other implementations, single instance messages, as described above, may be used in place of the established data communication 1018. Further, in some implementations, server computing device(s) 114 may facilitate the shareable applications 1308, 1310, such as by storing the book online and downloading the book pages to each telecommunications device upon receiving a command from one or the other of the shareable applications 1308, 1310.

Figure 14:
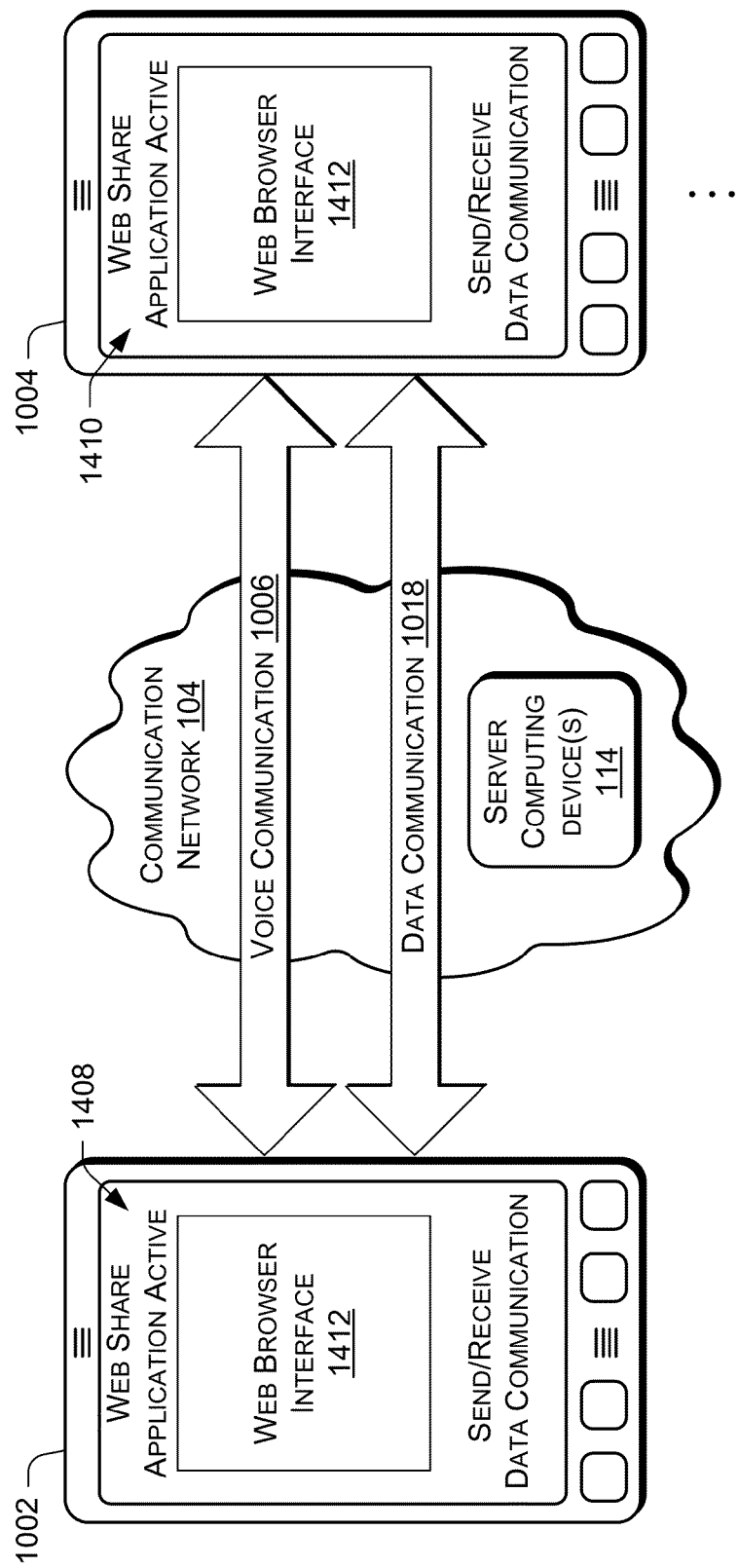
FIG. 14 illustrates another exemplary implementation of a bilateral shareable application.

FIG. 14 illustrates another example of a bilateral shareable application. In this example, the users of the telecommunications devices 1002, 1004 may decide that they would like to browse the Internet together while carrying on a conversation, such as for viewing one or more websites containing information in which they are interested. In this implementation, once the data communication 1018 is established, when one of the web browser interfaces 1412 is directed to a particular webpage by user input, the shareable application 1408, 1410 that received the input might automatically direct the web browser interface 1412 of the other telecommunications device to the same webpage so that the users of both telecommunications devices 1002, 1004 are presented with the same webpage for viewing at the same time. In this implementation, either user might be able to direct the web browser, or a master-slave relationship might be established, as discussed above. Additionally, while the illustrated implementation shows the use an established data communication, in other implementations, single instance messages, as described above, may be used in place of the established data communication 1018. Further, in some implementations, server computing device(s) 114 may facilitate the shareable applications 1408, 1410, such as by converting the web content to a suitable form factor for each telecommunications device.

While several examples of bilateral shareable applications have been described, numerous other possible applications, such as games, business applications, and the like, will be apparent to those of skill in the art in light of the disclosure presented herein, and the disclosure herein is not limited to the particular examples illustrated. Furthermore, although the implementations of the unilateral and bilateral shareable applications are presented in this disclosure as applying to voice communications between two telecommunications devices, it should be noted that more than two telecommunications devices may be connected for voice communication while also being connected for data communication. For example, three or more telecommunications devices might be engaged in a voice communication in a conference call while shareable applications on each of those telecommunications devices are linked via a data communication. Additionally, in some implementations, more than one shareable application can be executing on each telecommunications device and communicating with corresponding applications on one or more other telecommunications devices.

Figure 15:
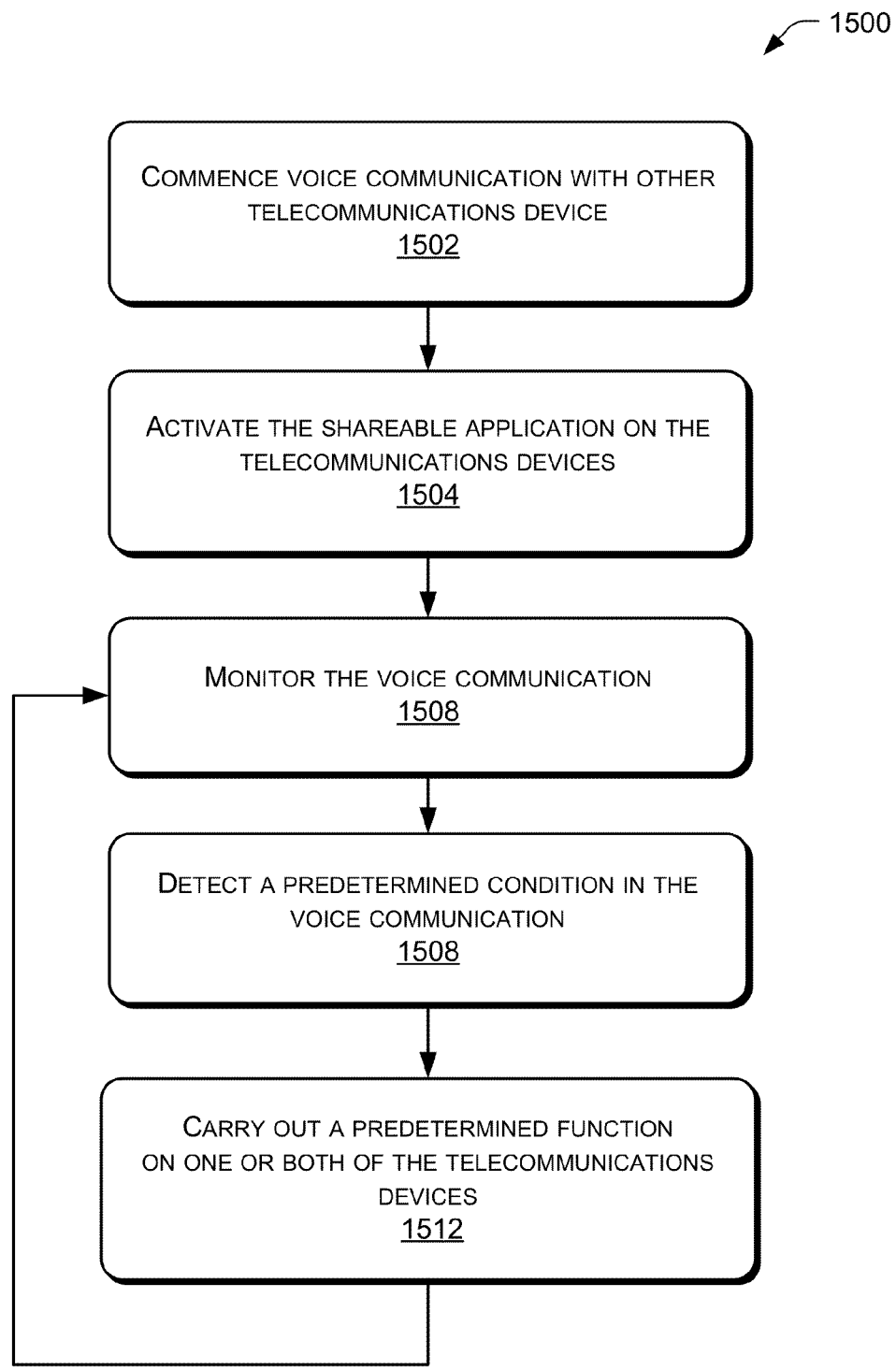
FIG. 15 illustrates a flow chart representing an exemplary process carried out in conjunction with execution of additional implementations of bilateral shareable applications.

FIG. 15 illustrates a flow chart representing an exemplary implementation of a process 1500 carried out in conjunction with execution of additional implementations of bilateral shareable applications on telecommunications devices. In these additional implementations, the applications on the telecommunications devices are able to interact with each other and/or also interact with the voice communication established between the telecommunications devices.

At block 1502, a voice communication is established between a plurality of telecommunications devices for enabling voice communications to be carried out between the telecommunications devices. For example, one of the telecommunications devices may initiate an outgoing call, or receive an incoming call.

At block 1504, the shareable application is activated on two or more of the telecommunications devices that are connected by the voice communication. For example, each user might already have the shareable application installed on their telecommunications device. In other implementations, one of the users might encourage the other user to install the application on their respective device so that the users are able to interact with each other via the shareable application. In any event, the users decide that they would like to activate a shareable application, and a first user activates an instance of the shareable application on the first user's telecommunications device and a second user activates an instance of the shareable application on the second user's telecommunications device. Alternatively, one or both of the shareable applications might activate automatically in response to a triggering event, such as connection of a voice call, or the like, as discussed above. In some implementations, the shareable application on each telecommunications device will automatically establish a data communication with the sharable application on the other telecommunications device that is party to the voice communication. However, in other implementations, a data communication might not be established, and each shareable application will operate independently of the other as with the unilateral shareable applications described above.

At block 1506, in some implementations, the shareable application on one or both of the telecommunications devices monitor the voice communication between the telecommunications devices. For example, the shareable applications monitor a conversation carried on between the first user and the second user over the voice communication. In some implementations, the shareable applications may run in the background and only become apparent when a predetermined condition or hook is detected. In other implementations, the shareable applications might present a user interface to the user of the telecommunications device for providing additional features and functions. Further, in some implementations, a counterpart shareable application on the server computing device(s) 114 may monitor the conversation instead of or in addition to the shareable applications on the telecommunications devices.

At block 1508, in some implementations, a predetermined condition is detected in the voice communication. For example, during monitoring of the conversation, the shareable application on the first user's device or on the second user's device detects a predetermined condition or hook in the conversation. In some implementations, for example, the application might detect a particular keyword or phrase spoken by one of the participants in the conversation, might detect a laugh or other noise made by one of the participants, or the like, and recognize this detected condition in the conversation as a trigger or hook for causing the application to carry out a predetermined function.

At block 1510, as a result of detecting the hook or predetermined condition in the conversation, at least one of the shareable application instances on the telecommunications devices or on the server computing device(s) 114 carries out a predetermined function on one or both of the telecommunications devices. For example, in some implementations, the shareable application might overlay a sound effect or jingle on the conversation, might cause a picture or advertisement to be transmitted to the first or second user via the data communication, might cause an application user interface to present a certain view or perform a certain function, or the like. After the shareable application has carried out the predetermined function, the process may return to block 1508, and the shareable applications may continue to monitor the conversation for performing additional such functions until the conversation is terminated.

Figure 16:
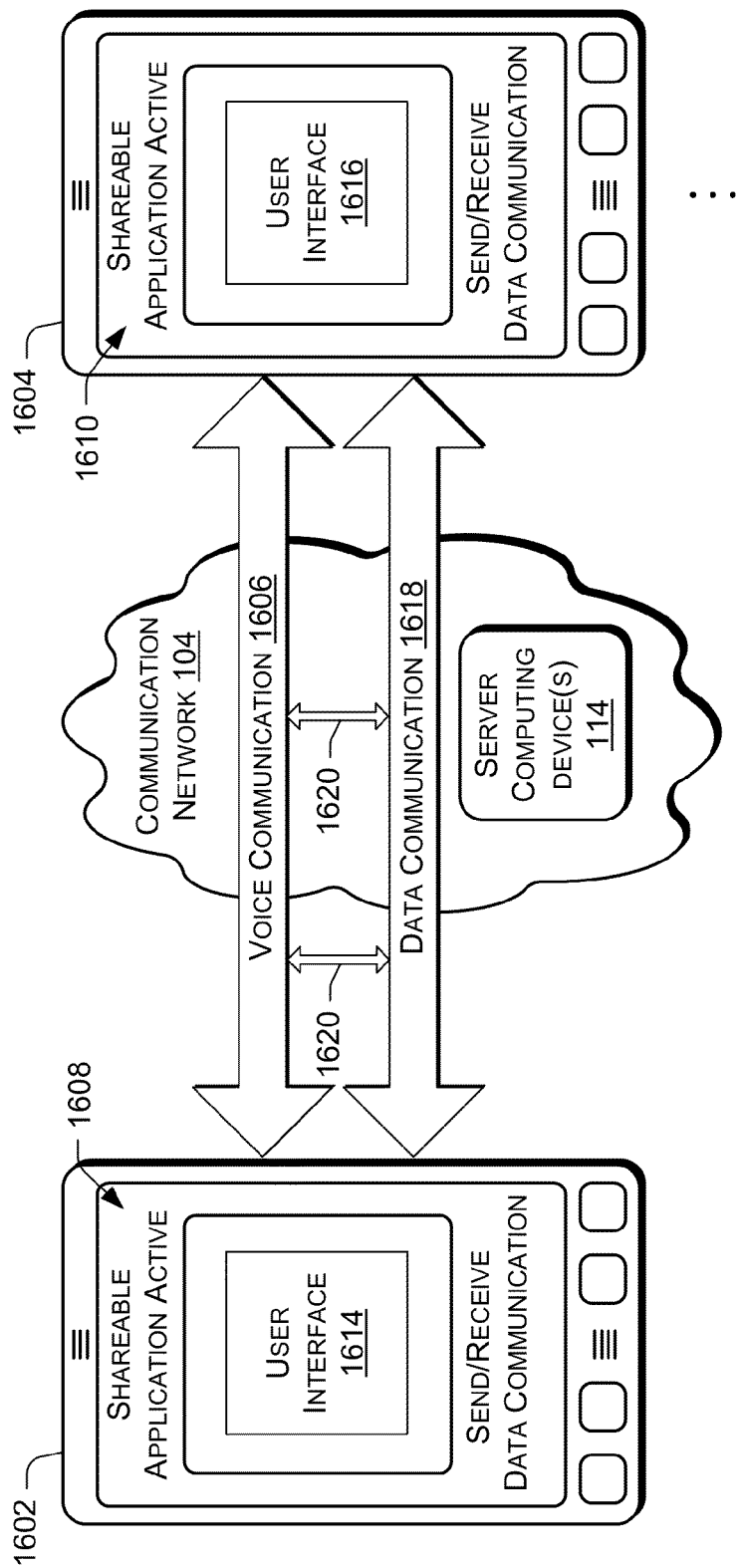
FIG. 16 illustrates an exemplary implementation of the additional implementations of bilateral shareable applications.

FIG. 16 illustrates an exemplary implementation of a bilateral shareable application that also interacts with a voice communication. In this implementation, a voice communication is established between a first user using a first telecommunications device 1602, and a second user using a second telecommunications device 1604. For example, the first user may call the second user, or vice versa, over a communications network, as discussed above with reference to FIG. 1, so that a voice communication 1606 is established between the first telecommunications device 1602 and the second telecommunications device 1604.

First telecommunications device 1602 may have a first bilateral shareable application 1608 loaded in memory and executing on the first telecommunications device, such as by being executed by one or more processors of the first telecommunications device as discussed above with reference to FIGS. 2A-2B. Similarly, second telecommunications device 1604 may have a second bilateral shareable application 1610 loaded in memory and executing on the second telecommunications device, such as by being executed by one or more processors of the second telecommunications device as discussed above with reference to FIGS. 2A-2B. First application 1608 may include a first user interface 1614 to give the first user control over the functions of the first application 1608. Similarly, second application 1610 may include a second user interface 1616 to give the second user control over the functions of the second application 1610.

As discussed above with reference to the examples of FIGS. 10-14, a data communication 1618 may be established between the first application 1608 and the second application 1610. In these implementations, the data communication 1618 is interactive with the voice communication 1606, as illustrated by arrows 1620. For example, applications 1608, 1610 may be similar to the unilateral data sharing application described above with reference to FIG. 7. However, in these implementations, when a hook or trigger is detected as a predetermined condition in the voice communication 1606, such as a laugh, keywords, etc., as discussed above, then the applications are able to communicate data directly via the data communication 1618. Additionally, while the illustrated implementation shows the use an established data communication, in other implementations, single instance messages, as described above, may be used in place of the established data communication 1618. Further, as discussed above, the server computing device(s) 114 may alternatively, or additionally, detect the trigger in the conversation for delivering content to the telecommunications devices or for adding sound overlays to the voice communication. For example, when a particular word is detected, the server computing device(s) 114 can overlay a sound effect or jingle on the voice communication, or deliver an image or other content to each of the telecommunications devices.

Figure 17:
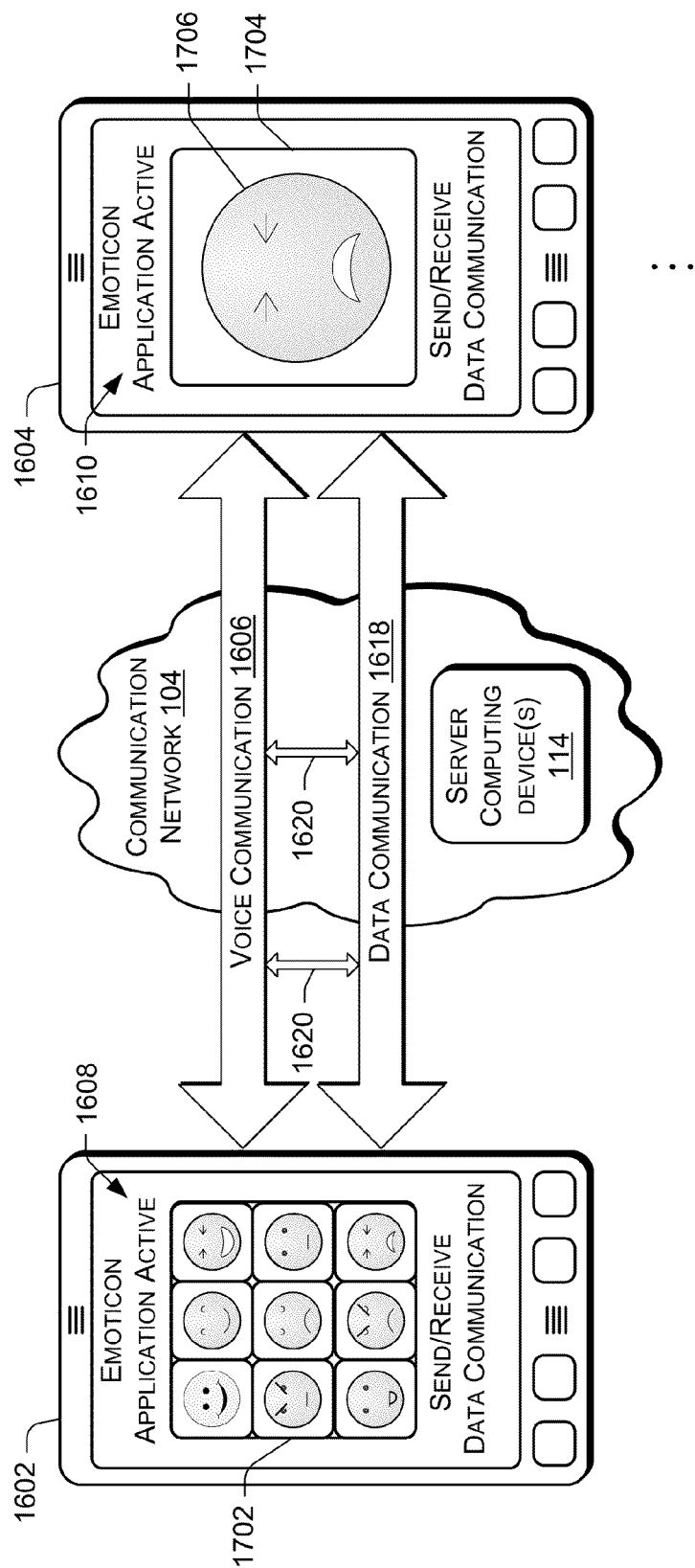
FIG. 17 illustrates another exemplary implementation of the additional implementations of bilateral shareable applications.

FIG. 17 illustrates an example of an implementation of a bilateral shareable application with voice communication interaction which enables a first user and the second user to exchange data in response to predetermined conditions detected in the voice communication. For example, the first telecommunications device 1620 may include a first user interface 1702 provided by the shareable application 1608, and second telecommunications device 1604 may include a second user interface 1704 provided by the shareable application 1610. When a predetermined condition is detected by either instance of the shareable applications 1608, 1610, an emoticon image 1706 may be transmitted from one of the telecommunications devices to the other and displayed on the respective user interface 1702, 1704. For example, if the user of the first telecommunications device groans, an image of an emoticon 1706 representing the user's emotion may be simultaneously displayed on the second telecommunications device. The emoticon image may be transmitted from the first telecommunications device to the second telecommunications device by the first sharable application 1608, or may be generated at the second telecommunications device by the second shareable application 1610. Additionally, while the illustrated implementation shows the use an established data communication, in other implementations, single instance messages, as described above, may be used in place of the established data communication 1618. In addition, the above-describe functions may alternatively or additionally be carried out by server computing device(s) 114 on the communication network 104.

Furthermore, various additional features may be implemented in the examples previously described above with respect to FIGS. 6-8 and 10-14 using the additional monitoring of the voice communication. For example, with respect to the photograph or slide presentation implementation of FIG. 11, the shareable applications may monitor the voice communication and automatically detect when the user has finished talking about a particular photograph or presentation slide and proceed to the next image in the photo group or slide deck. Similarly, with respect to the book reading implementation of FIG. 13, the application may monitor the voice communication and detect that the reader has reached the end of the page of the book and automatically display the next page in the book. Other variations will also be apparent to those of skill in the art in light of the disclosure provided herein.

Figure 18:
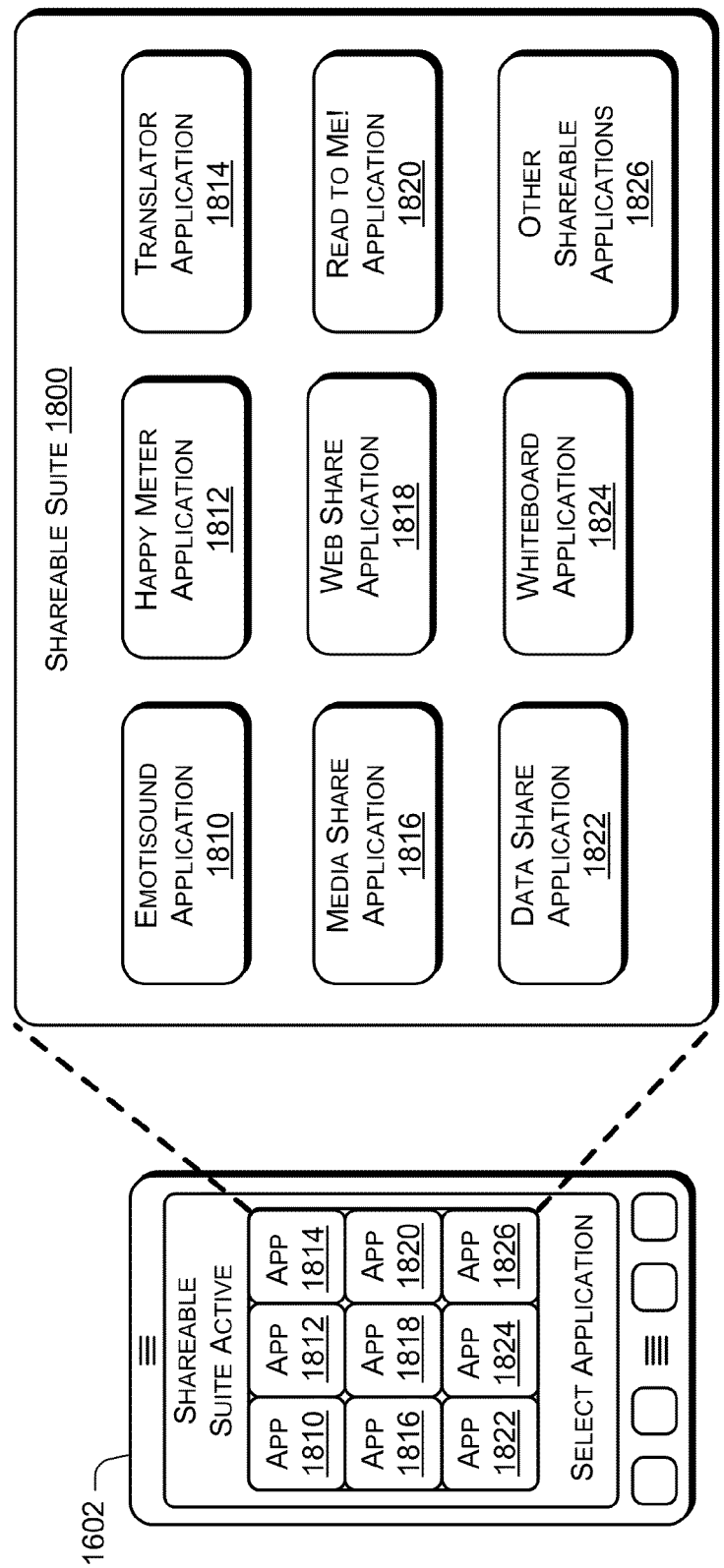
FIG. 18 illustrates an exemplary suite of shareable applications according to some implementations.

FIG. 18 illustrates management of the shareable applications on a telecommunication device as a suite 1800. For example, the shareable applications 1810-1826 described above may be packaged and managed as a suite 1800 that enables unitary purchasing, downloading, updating and the like of the shareable applications 1810-1826.

From the foregoing, it should be apparent that implementations herein provide applications, user interfaces, program modules, and the like for enabling transferring and sharing of data between telecommunications devices while carrying on a simultaneous voice communication on the telecommunications devices. In some implementations, one or more shareable applications on a telecommunications device are able to interact with the voice content of the conversation for carrying out one or more functions of the application in response to or as a result of detecting a predetermined condition in the voice communication. Furthermore, some implementations enable applications executing on each of the telecommunications devices interact with each other during a voice communication and/or interact with the voice communication itself.

Implementations also relate to telecommunications devices selectively activated or reconfigured by one or more applications or programs when the program instructions are executed. Such applications or programs may be stored in one or more processor-readable or computer-readable storage mediums having processor-readable program code embodied therein. The processor-readable program code is implemented at least in part by one or more processors to perform functions of the implementations described herein. The one or more processor-readable storage mediums may include, but are not limited to magnetic disks, read-only memories, random access memories, solid-state devices and drives, memory cards, or any other type of medium suitable for storing electronic information, and may in some implementations be stored at a location remote from the one or more processors executing the one or more programs.

Further, it should be noted that the system configurations illustrated in FIGS. 1-3, 5-8, 10-14 and 16-18 are purely exemplary of systems in which the implementations may be provided, and the implementations are not limited to the particular hardware configurations illustrated. In the description, numerous details are set forth for purposes of explanation in order to provide a thorough understanding of the disclosure. However, it will be apparent to one skilled in the art that not all of these specific details are required.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

The invention claimed is:

1. A method comprising:
    launching a shareable application on a first telecommunications device during a voice communication between the first telecommunications device and a second telecommunications device;
    monitoring the voice communication between the first telecommunications device and the second telecommunications device for detecting a predetermined condition in the voice communication;
    initiating a user perceptible function on the first telecommunications device; and
    sending one of data or instructions to the second telecommunications device to enable initiation of the user perceptible function on the second telecommunications device,
    wherein the initiating the user perceptible function further comprises executing a predetermined function upon detecting the predetermined condition in the voice communication.

2. The method according to claim 1, wherein:
    the initiating a user perceptible function further comprises displaying a plurality of images on the first telecommunications device; and
    the sending one of data or instructions to the second telecommunications device further comprises, as each image is displayed on the first telecommunications device, sending instructions to the second telecommunications device to display a same corresponding image on the second telecommunications device during the voice communication.

3. The method according to claim 2, wherein the images are stored in a location on a network and provided to the first telecommunications device and the second telecommunications device from the location on the network during the voice communication.

4. The method according to claim 1, wherein:
    the initiating a user perceptible function further comprises displaying handwritten inputs made to a user interface on the first telecommunications device; and
    the sending one of data or instructions to the second telecommunications device further comprises sending the handwritten inputs to the second telecommunications device to display the handwritten inputs on the second telecommunications device during the voice communication.

5. The method according to claim 1, wherein:
    the initiating a user perceptible function further comprises directing a web browser of the first telecommunications device to a particular webpage; and
    the sending one of data or instructions to the second telecommunications device further comprises sending instructions to the second telecommunications device to direct a web browser on the second communication device to the particular webpage during the voice communication.

6. The method according to claim 1, wherein the launching the shareable application on the first telecommunications device further comprises automatically establishing a data communication between the shareable application on the first telecommunications device and a shareable application on the second telecommunications device by exchanging IP (Internet Protocol) addresses during the voice communication.

7. The method according to claim 1, wherein the executing the predetermined function comprises overlaying a predetermined sound on a conversation in the voice communication.

8. The method according to claim 1, wherein the executing the predetermined function comprises translating the voice communication from a first language to a second language.

9. The method according to claim 8, wherein the translating is carried out by a server computing device on a network that receives the voice communication from the second telecommunication device and recognizes words in the voice communication as being in the first language, translates the recognized words from the first language to the second language and provides the translated words for producing sound using automated speech generation, wherein translated and automatically generated speech is provided to the user of the first telecommunications device.

10. A non-transitory storage medium having a plurality of programming instructions stored thereon which, when executed by a processor of a computing device, cause the computing device to perform operations comprising:
    launching a shareable application on a first telecommunications device during a voice communication between the first telecommunications device and a second telecommunications device;
    monitoring the voice communication between the first telecommunications device and the second telecommunications device for detecting a predetermined condition in the voice communication;
    initiating a user perceptible function on the first telecommunications device; and
    sending one of data or instructions to the second telecommunications device to enable initiation of the user perceptible function on the second telecommunications device,
    wherein the initiating the user perceptible function further comprises executing a predetermined function upon detecting the predetermined condition in the voice communication.

11. The non-transitory computer readable medium according to claim 10, wherein:
    the initiating a user perceptible function further comprises displaying a plurality of images on the first telecommunications device; and
    the sending one of data or instructions to the second telecommunications device further comprises, as each image is displayed on the first telecommunications device, sending instructions to the second telecommunications device to display a same corresponding image on the second telecommunications device during the voice communication.

12. The non-transitory computer readable medium according to claim 11, wherein the images are stored in a location on a network and provided to the first telecommunications device and the second telecommunications device from the location on the network during the voice communication.

13. The non-transitory computer readable medium according to claim 10, wherein:
the initiating a user perceptible function further comprises displaying handwritten inputs made to a user interface on the first telecommunications device; and
the sending one of data or instructions to the second telecommunications device further comprises sending the handwritten inputs to the second telecommunications device to display the handwritten inputs on the second telecommunications device during the voice communication.

14. The non-transitory computer readable medium according to claim 10, wherein:
the initiating a user perceptible function further comprises directing a web browser of the first telecommunications device to a particular webpage; and
the sending one of data or instructions to the second telecommunications device further comprises sending instructions to the second telecommunications device to direct a web browser on the second communication device to the particular webpage during the voice communication.

15. The non-transitory computer readable medium according to claim 10, wherein the launching the shareable application on the first telecommunications device further comprises automatically establishing a data communication between the shareable application on the first telecommunications device and a shareable application on the second telecommunications device by exchanging IP (Internet Protocol) addresses during the voice communication.

16. The non-transitory computer readable medium according to claim 10, wherein the executing the predetermined function comprises overlaying a predetermined sound on a conversation in the voice communication.

17. The non-transitory computer readable medium according to claim 10, wherein the executing the predetermined function comprises translating the voice communication from a first language to a second language.

18. The non-transitory computer readable medium according to claim 17, wherein the translating is carried out by a server computing device on a network that receives the voice communication from the second telecommunication device and recognizes words in the voice communication as being in the first language, translates the recognized words from the first language to the second language and provides the translated words for producing sound using automated speech generation, wherein translated and automatically generated speech is provided to the user of the first telecommunications device.

19. A computing device comprising:
a processor;
a plurality of programming instructions configured to be operated by the processor to perform operations including:
launching a shareable application on a first telecommunications device during a voice communication between the first telecommunications device and a second telecommunications device;
monitoring the voice communication between the first telecommunications device and the second telecommunications device for detecting a predetermined condition in the voice communication;
initiating a user perceptible function on the first telecommunications device; and
sending one of data or instructions to the second telecommunications device to enable initiation of the user perceptible function on the second telecommunications device,
wherein the initiating the user perceptible function further comprises executing a predetermined function upon detecting the predetermined condition in the voice communication.

20. The computing device according to claim 19, wherein:
the initiating a user perceptible function further comprises displaying a plurality of images on the first telecommunications device; and
the sending one of data or instructions to the second telecommunications device further comprises, as each image is displayed on the first telecommunications device, sending instructions to the second telecommunications device to display a same corresponding image on the second telecommunications device during the voice communication.

21. The computing device according to claim 20, wherein the images are stored in a location on a network and provided to the first telecommunications device and the second telecommunications device from the location on the network during the voice communication.

22. The computing device according to claim 19, wherein:
the initiating a user perceptible function further comprises displaying handwritten inputs made to a user interface on the first telecommunications device; and
the sending one of data or instructions to the second telecommunications device further comprises sending the handwritten inputs to the second telecommunications device to display the handwritten inputs on the second telecommunications device during the voice communication.

23. The computing device according to claim 19, wherein:
the initiating a user perceptible function further comprises directing a web browser of the first telecommunications device to a particular webpage; and
the sending one of data or instructions to the second telecommunications device further comprises sending instructions to the second telecommunications device to direct a web browser on the second communication device to the particular webpage during the voice communication.

24. The computing device according to claim 19, wherein the launching the shareable application on the first telecommunications device further comprises automatically establishing a data communication between the shareable application on the first telecommunications device and a shareable application on the second telecommunications device by exchanging IP (Internet Protocol) addresses during the voice communication.

25. The computing device according to claim 19, wherein the executing the predetermined function comprises overlaying a predetermined sound on a conversation in the voice communication.

26. The computing device according to claim 19, wherein the executing the predetermined function comprises translating the voice communication from a first language to a second language.

27. The computing device according to claim 26, wherein the translating is carried out by a server computing device on a network that receives the voice communication from the second telecommunication device and recognizes words in the voice communication as being in the first language, translates the recognized words from the first language to the second language and provides the translated words for producing sound using automated speech generation, wherein translated and automatically generated speech is provided to the user of the first telecommunications device.

\* \* \* \* \*